US011144129B2

United States Patent
Khabrani

(10) Patent No.: US 11,144,129 B2
(45) Date of Patent: Oct. 12, 2021

(54) DEPTH SENSING INFRARED INPUT DEVICE AND ASSOCIATED METHODS THEREOF

(71) Applicant: Panasonic Avionics Corporation, Lake Forest, CA (US)

(72) Inventor: Gurmukh Khabrani, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 16/809,438

(22) Filed: Mar. 4, 2020

(65) Prior Publication Data
US 2021/0278905 A1   Sep. 9, 2021

(51) Int. Cl.
| | |
|---|---|
| *G06F 3/01* | (2006.01) |
| *G06T 7/20* | (2017.01) |
| *B60R 11/04* | (2006.01) |
| *B60R 11/02* | (2006.01) |
| *B60R 11/00* | (2006.01) |

(52) U.S. Cl.
CPC .......... *G06F 3/017* (2013.01); *B60R 11/0229* (2013.01); *B60R 11/04* (2013.01); *G06T 7/20* (2013.01); *B60R 2011/0014* (2013.01); *G06T 2207/10012* (2013.01); *G06T 2207/10048* (2013.01); *G06T 2207/20081* (2013.01)

(58) Field of Classification Search
CPC ................ B60R 11/0229; B60R 11/04; B60R 2011/0014; B60T 7/20; B60T 2207/10012; B60T 2207/10048; G06T 2207/20081; G06F 3/017; G60T 2207/10012; G60T 2207/10048; G60T 7/20

See application file for complete search history.

(56) References Cited

U.S. PATENT DOCUMENTS

| | | | | |
|---|---|---|---|---|
| 8,971,572 | B1 * | 3/2015 | Yin ..................... | G06K 9/00624 382/103 |
| 9,037,354 | B2 | 5/2015 | Mondragon et al. | |
| 10,146,320 | B2 | 12/2018 | Schalla et al. | |
| 2012/0132746 | A1 * | 5/2012 | Sizelove ................ | A47C 7/62 244/118.6 |
| 2013/0066526 | A1 * | 3/2013 | Mondragon ............ | G06F 3/017 701/48 |

(Continued)

FOREIGN PATENT DOCUMENTS

CN          109492578 A        3/2019

*Primary Examiner* — Hong Zhou
(74) *Attorney, Agent, or Firm* — Klein, O'Neill & Singh, LLP

(57) ABSTRACT

Methods and systems are provided for a hand tracking device. The hand tracking device includes a first infrared camera for capturing a plurality of images of a user hand indicating a first gesture for requesting a first action associated with operating a display device. The hand tracking device utilizes the plurality of images to generate a three-dimensional image of the user hand; and detects the first gesture from the three-dimensional image using a trained model that stores a plurality of input gestures corresponding to three-dimensional images of user hands. A first operation is executed in response to the detected first gesture. The hand tracking device continuously monitors the user hand to detect a second gesture from the trained model for executing a second operation.

22 Claims, 31 Drawing Sheets

(56) References Cited

U.S. PATENT DOCUMENTS

| | | | |
|---|---|---|---|
| 2013/0249786 A1* | 9/2013 | Wang | G06K 9/00389 |
| | | | 345/156 |
| 2015/0105976 A1 | 4/2015 | Shikii et al. | |
| 2015/0175172 A1* | 6/2015 | Truong | G06F 3/017 |
| | | | 701/36 |
| 2017/0124410 A1* | 5/2017 | Cho | G06K 9/00362 |
| 2019/0171302 A1 | 6/2019 | Su et al. | |
| 2019/0212819 A1 | 7/2019 | Piao et al. | |
| 2020/0105055 A1* | 4/2020 | Sethi | G06T 7/55 |

\* cited by examiner

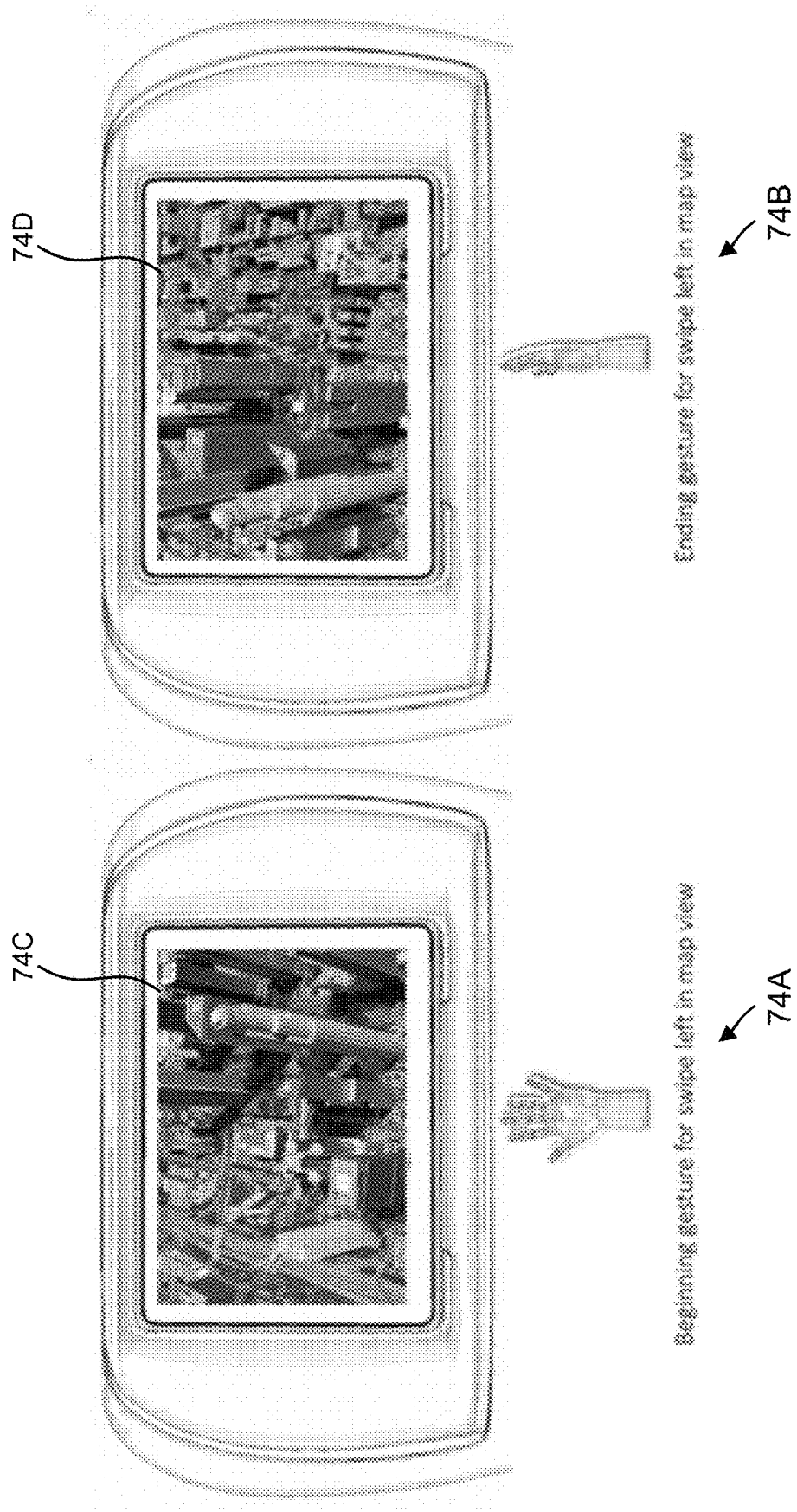

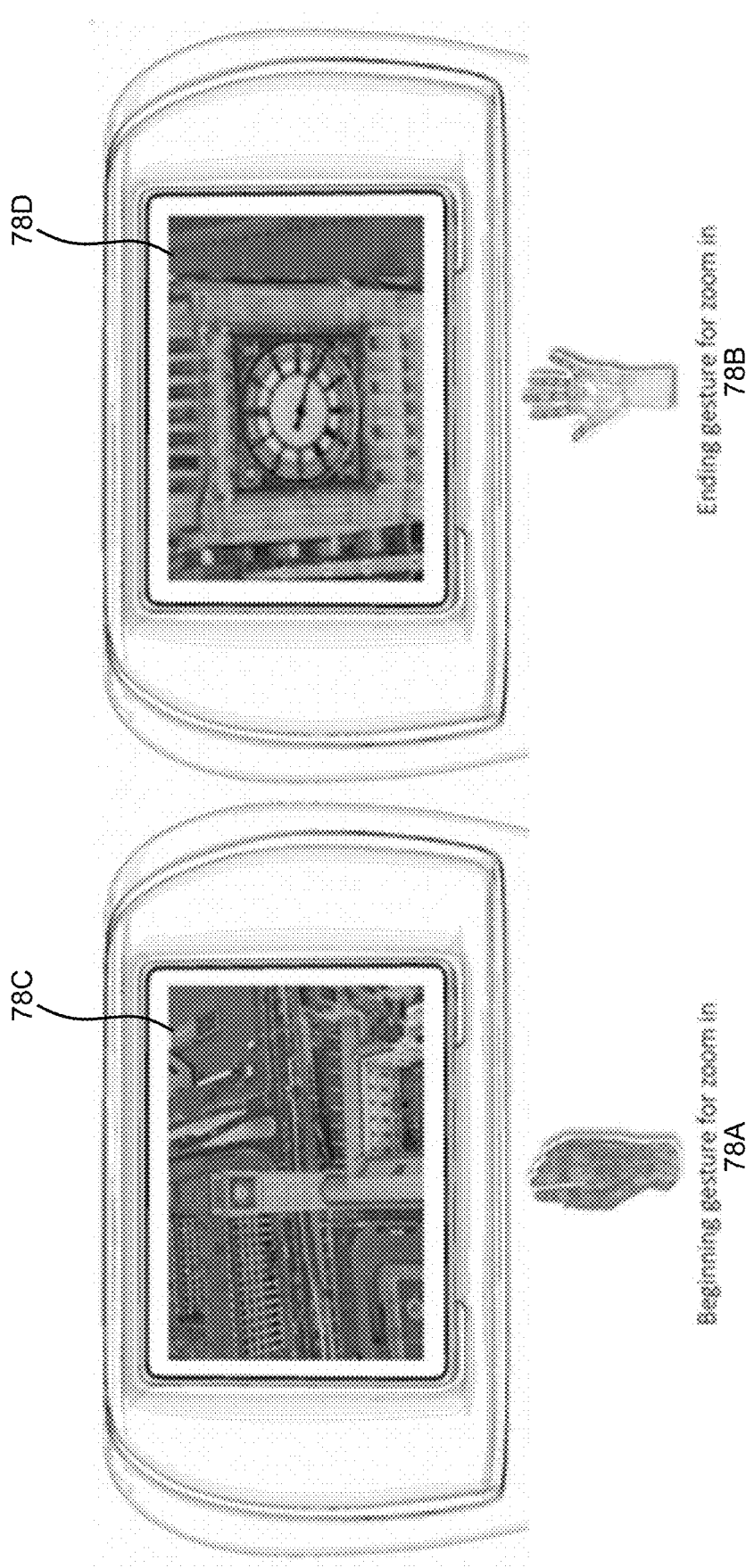

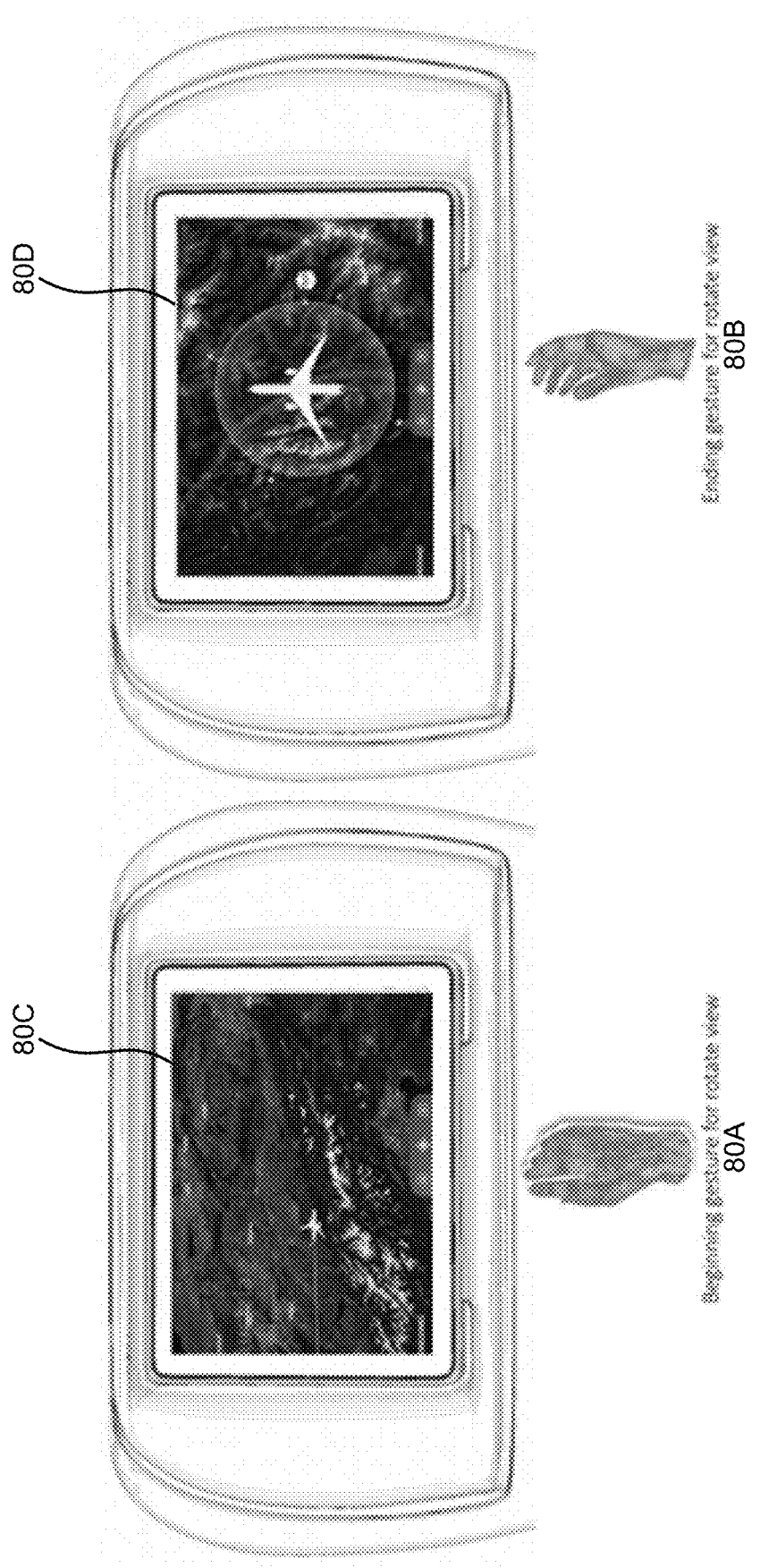

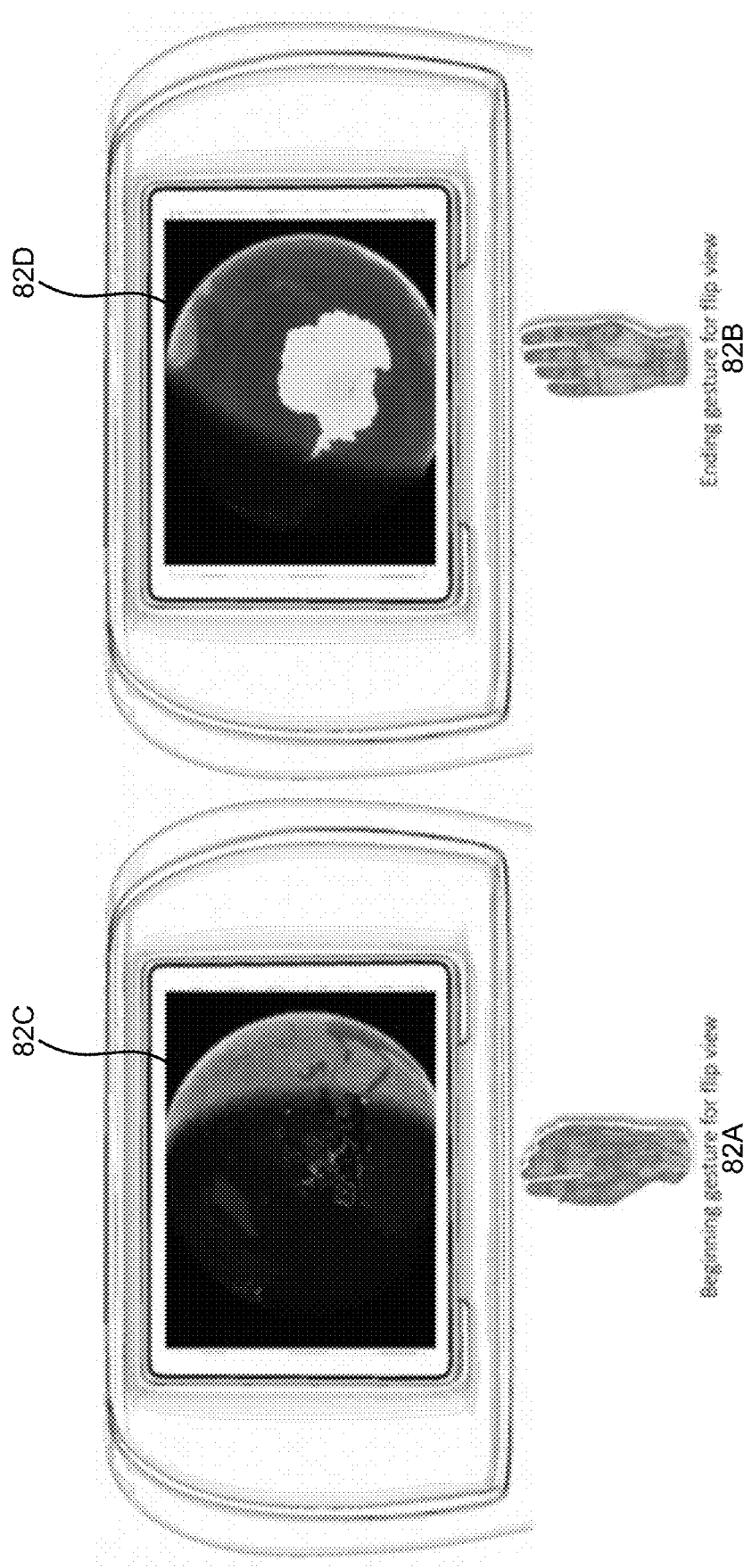

DEPTH SENSING INFRARED INPUT DEVICE AND ASSOCIATED METHODS THEREOF

TECHNICAL FIELD

The present disclosure relates to input devices, and more particularly, to depth sensing infrared input devices.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

Typically, to interface with IFE systems, users use handsets with directional pads (or "D-pads") (also referred to as control pads). The D-pads are hand operated and are used by to select user interface ("UI") elements on a display device. Operating the D-pads with fingers may be inconvenient for certain passengers and may also be painful for others. Therefore, handsets with D-pads may not be desirable for certain passengers.

Touch sensitive screens may also be used as input devices to access UI elements of an IFE system. This approach is also an undesirable because it relies on users to move their arms and hands, which may cause fatigue over time, especially during travel.

Other conventional technology for input devices is also not desirable. For example some conventional methods require a user to register their hands with a system that attempts to provide gesture control. Such systems also only use two-dimensional images from a single camera that may not be very accurate for gesture detection.

Continuous efforts are being made to develop technology that enables users to comfortably interface with display devices and reduce the inconvenience of existing state of the art input methods and devices.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures

FIG. 7A shows a beginning gesture for swiping an image on a display device, according to one aspect of the present disclosure;

FIG. 7B shows an ending gesture for swiping an image on a display device, according to one aspect of the present disclosure;

FIG. 7E shows a beginning gesture for zooming content on a display device, according to one aspect of the present disclosure;

FIG. 7F shows an ending gesture for zooming content on a display device, according to one aspect of the present disclosure;

FIG. 7G shows a beginning gesture for rotating content on a display device, according to one aspect of the present disclosure;

FIG. 7H shows an ending gesture for rotating content on a display device, according to one aspect of the present disclosure;

FIG. 7I shows a beginning gesture for flipping content view on a display device, according to one aspect of the present disclosure;

FIG. 7J shows an ending gesture for flipping content view on a display device, according to one aspect of the present disclosure;

DETAILED DESCRIPTION

Figure 1A:
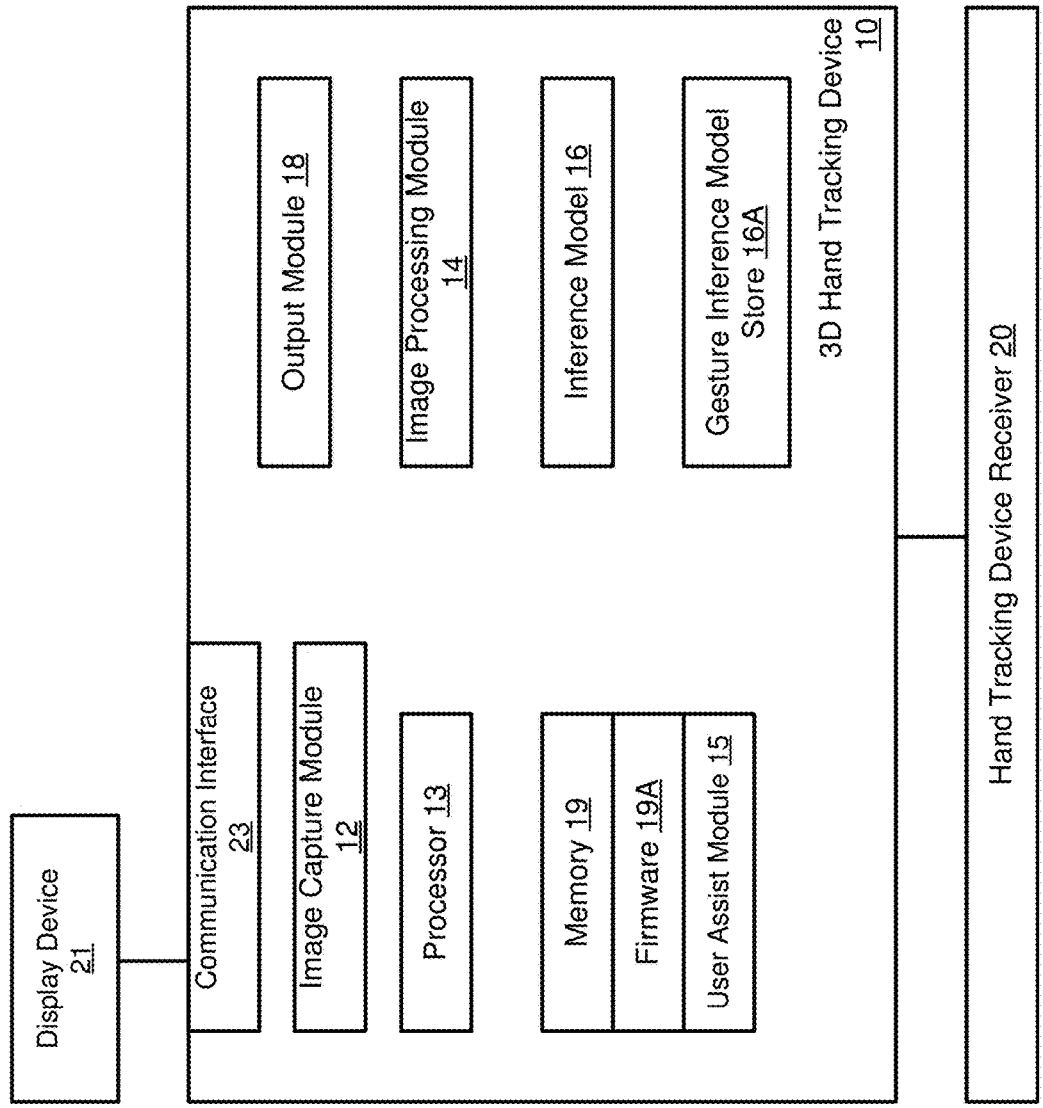
FIG. 1A shows a block diagram of a three-dimensional ("3D") hand tracking device, according to one aspect of the present disclosure.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, a hardware device, an object, an executable, a thread of execution, a program, and/or a computer.

By way of illustration, both an application running on a computing device and the computing device can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, technology for a novel input device is disclosed. The input device is configured to operate with or integrated with a structure, for example, an armrest of a passenger seat of a transportation vehicle. It is noteworthy that although the examples described below are illustrated with respect to an armrest, the various adaptive aspects are not limited to armrests and may be used with any structure that a user is able to use.

In one aspect, the input device includes at least two infrared sensors/cameras that detect thermal radiation emitted by a user's hand placed on or above a surface of the input device. The surface may be opaque to the visible spectrum and transparent to the infrared spectrum. The infrared cameras are oriented in a manner to capture multiple images of the user's hand to generate a three-dimensional ("3D") image of the user's hand indicating a gesture. The generated image may be displayed on a display screen indicating the gesture. The input device captures changes in the hand position and provides visual feedback indicating the changes in the hand's position.

The input device detects input gestures from the changes in the hand positions. The gestures are detected from a machine learning trained inference model (may also be referred to as "an inference model", "a trained model", "a training model", "machine learning gesture trained model" or simply "a model") that stores different gestures corresponding to change in passenger hand positions. The inference model is developed with a training dataset, as described below and is updated regularly to improve accuracy of gesture detection. An action associated with the detected gesture is executed.

In another aspect, when a 3D user image does not match with a gesture, the user is provided feedback with instructions to modify user hand position.

In yet another aspect, the input device is used as an infra-red light source to illuminate the hand for better image capture.

In yet another aspect, instead of using multiple infrared cameras, only a single camera in conjunction with a plurality of mirrors are used. The camera takes a direct image of the hand as well as images of the hand's reflection, as described below in detail. The multiple images are used to generate a 3D image. The 3D image is then processed to identify a gesture and an appropriate action associated with the gesture is executed. Details regarding the various aspects of the present disclosure are provided below.

3D Hand Tracking Device 10: FIG. 1A shows a block diagram of a 3D hand tracking device 10 (may be referred to as "device 10"), according to one aspect of the present disclosure. Device 10 communicates with a display device 21 via a communication interface 23. The display device 21 may be a seat device of an IFE system on an aircraft or a computing device on any transportation vehicle, as described below. In one aspect, the communication interface 23 establishes a wired connection between device 10 and the display device 21. In another aspect the connection may be wireless. In yet another aspect, device 10 operates as a peripheral device for the display device 21 connected by a peripheral bus, e.g. a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type. The communication interface 23 includes logic and circuitry to communicate with display device 21 based on an interface type.

In one aspect, device 10 includes an image capturing module 12 (may also be referred to as "module 12") that captures multiple images of a user's hand to detect a hand gesture. The images are processed by an image processing module 14 (may also be referred to as "module 14") to generate a 3D image of the user's hand. It is noteworthy that although module 14 is shown within device 10, it may be located at any other location.

In one aspect, the 3D image generated by module 14 is processed by device 10 for inferencing (i.e. identifying a gesture) using an inference model 16 (may also be referred to as "machine learning inference model 16", "machine learning gesture training model 16", "model 16", "trained model 16", or "training model 16") that may be saved in a gesture inference model store 16A (may also be referred to as "a gesture data store 16A"). It is noteworthy that although inference model 16 and the gesture inference model store 16A are shown in separate blocks for convenience, the gesture inference model store 16A may be integrated with the inference model 16. In one aspect, the inference model 16 maintains the gesture inference model store 16A to identify a gesture based on different user hand positions/movements. The inference model 16 is trained using different user hand images and positions. The gesture inference model store 16A is updated periodically to improve the overall accuracy of detecting hand gestures by the device 10.

Once a gesture is detected, the gesture information is provided to a processing unit of the display device 21 by an output module 18. Based on the output from the output module 18, an appropriate action is taken to respond to the detected gesture, as described below in detail.

In one aspect, device 10 includes one or more processor(s) 13 that operate as the central processing unit(s) (CPUs) for device 10 and, thus, control its overall operation. In certain aspects, processor 13 accomplishes this by executing firmware instructions 19A stored at memory 19. As an example, the firmware instructions 19A include processor executable instructions for module 12 to capture images, instructions for module 14 for processing the captured images, instructions for identifying a gesture using the gesture inference model store 16A and instructions for the output module 18 to communicate with the display device 21 via the communication interface 23.

Processor 13 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 19 represents any form of random access memory (RAM), read-only memory (ROM), flash memory, or the like, or a combination of such devices.

It is noteworthy that in some aspect, device 10 may only include module 12 to capture images, while module 14 is executed by the display device 21 or at a server remote to both device 10 and display device 21.

In one aspect, device 10 includes or has access to a user assist module 15 (may also be referred to as "module 15"). Module 15 is configured to provide guidance to users in real-time to use device 10. The guidance enables a user to use a proper gesture for interfacing with the display device. The guidance may be audio/video/text, and is dynamic i.e. when a user makes a gesture, module 15 interfacing with gesture inference model store 16A instructs the user to modify the gesture. This may be achieved by playing a media file stored at device 10 (e.g. memory 19) or stored at the display device 21, as described below in detail. It is noteworthy that module 15 may also be integrated with inference model 16.

In one aspect, device 10 is integrated with another structure shown as 3D hand tracking device receiver 20 (may be referred to as "receiver 20"). An example of the receiver 20 is an armrest of a passenger seat, as described below in detail. The adaptive aspects of the present disclosure are not limited to an armrest or any other structure.

Figure 1B:
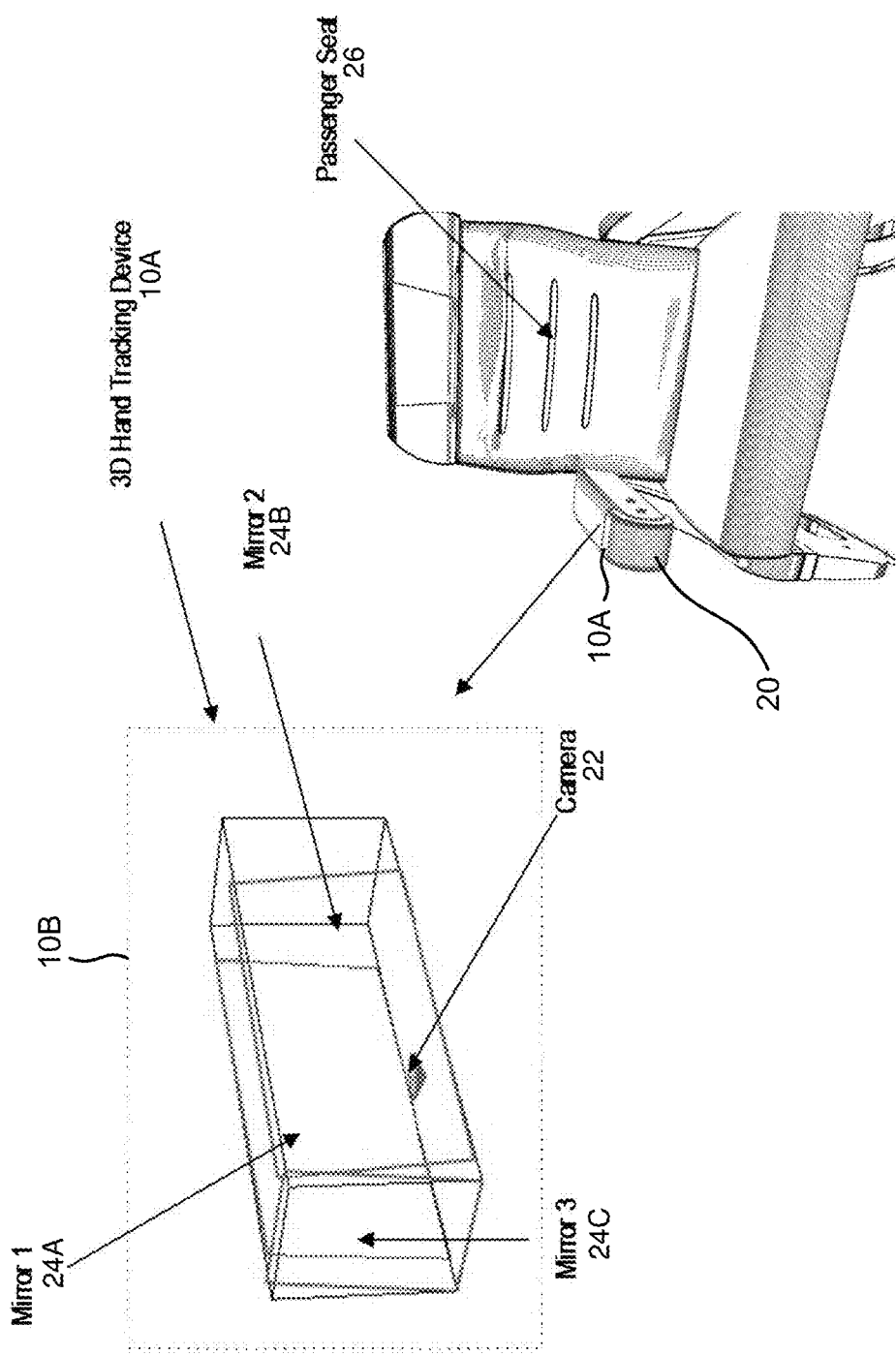
FIG. 1B shows an example of the 3D hand tracking device using an infrared camera and a plurality of mirrors, according to one aspect of the present disclosure.

FIG. 1B shows a device 10A within a rectangle 10B with an infrared camera 22 (may be referred to as "camera 22") and a plurality of mirrors 24A-24C, together forming the image capturing device 12, according to one aspect of the present disclosure. Device 10A is a variation of device 10 described above with respect to FIG. 1A. A passenger seat 26 with an armrest 20 operates as a receiver for device 10A, according to one aspect of the present disclosure. Camera 22 simultaneously takes images of the hand and the hand reflections at the plurality of mirrors 24A-24C. This enables camera 22 to capture hand images from different angles. In one aspect, the camera 22 includes a wide angle lens to capture a direct view of a hand as well as the reflections from mirrors 24A-24C at different angles. It is noteworthy that device 10B is configured such that the direct image of the hand taken by the bottom camera 22 and the image of the reflections at the mirrors 24A-24C need to be available for use. For example, if a user's hand is above a certain height from the armrest surface 32, then the hand reflections may not be available at mirrors 24A-24C. In that case, device 10B ignores any image taken by the bottom camera 22 to reduce a number of false positives in detecting user hand gestures. Examples of using the various mirrors 24A-24C and camera 22 are provided below.

Figure 1C:
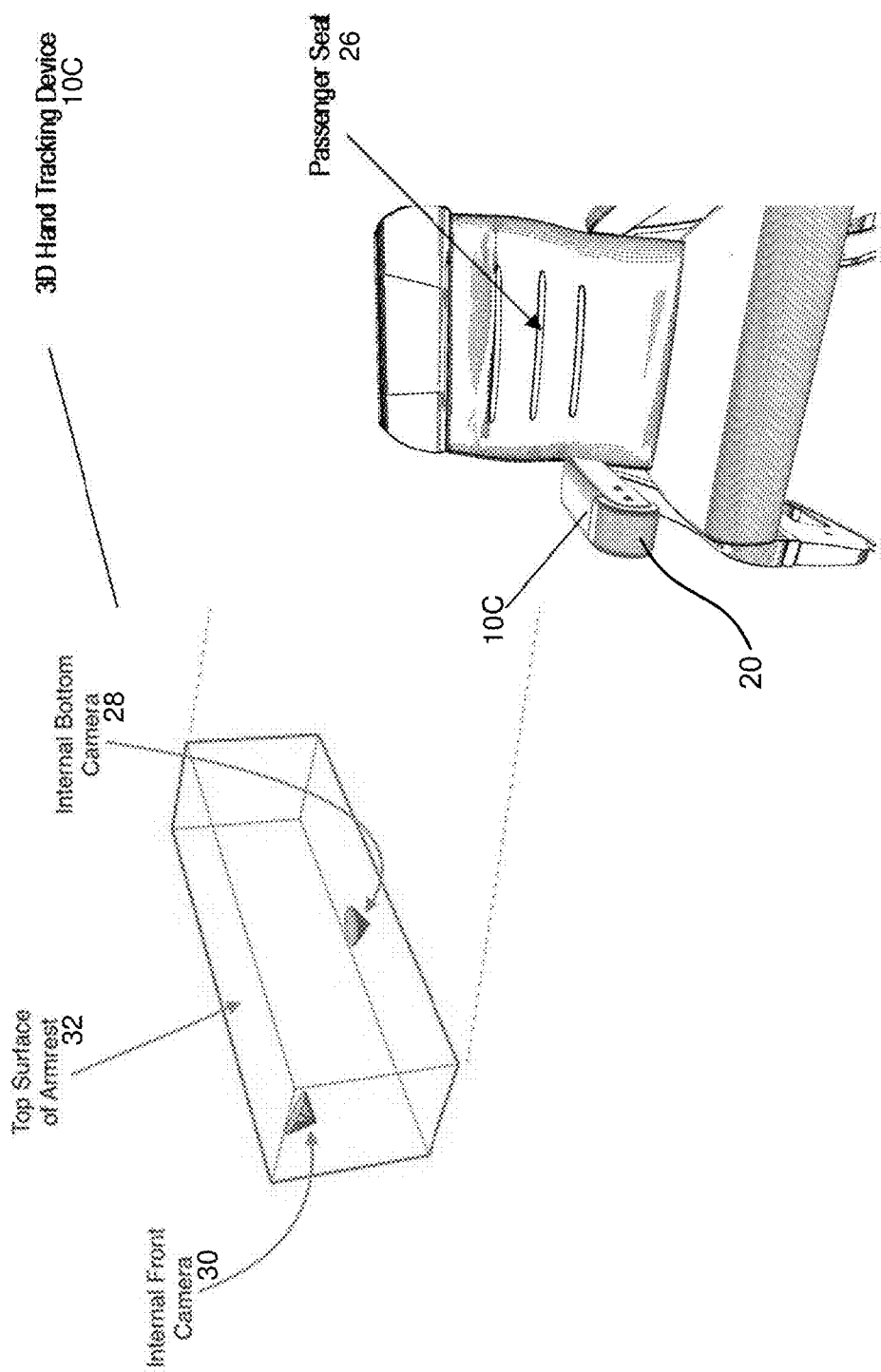
FIG. 1C shows an example of the 3D hand tracking device using multiple infrared cameras, according to one aspect of the present disclosure.

FIG. 1C shows a device 10C, according to one aspect of the present disclosure. Device 10C is a variation of device 10 described above. Device 10C includes an internal bottom infrared camera 28 (may be referred to as "camera 28" or "bottom camera 28") facing upwards and a front infrared camera (maybe referred to as "camera 30" or "front camera 30") at a front-top at an angle tilted with respect to a horizontal armrest surface 32. By placing cameras 28 and 30 at different locations and elevations with respect to the armrest surface 32, device 10C is able to capture depth when taking images of a user's hand, and hence, can generate an accurate 3D image of a hand to detect a hand gesture. It is noteworthy that device 10C is configured such that both camera images need to be available for use. For example, if a user's hand is above a certain height from the armrest surface 32, then the front camera 30 is unable to taken an image of the hand. In that case, device 10C ignores the image taken by the bottom camera 28 to reduce a number of false positives in detecting user hand gestures. Details of using device 10C are provided below.

Figure 2A:
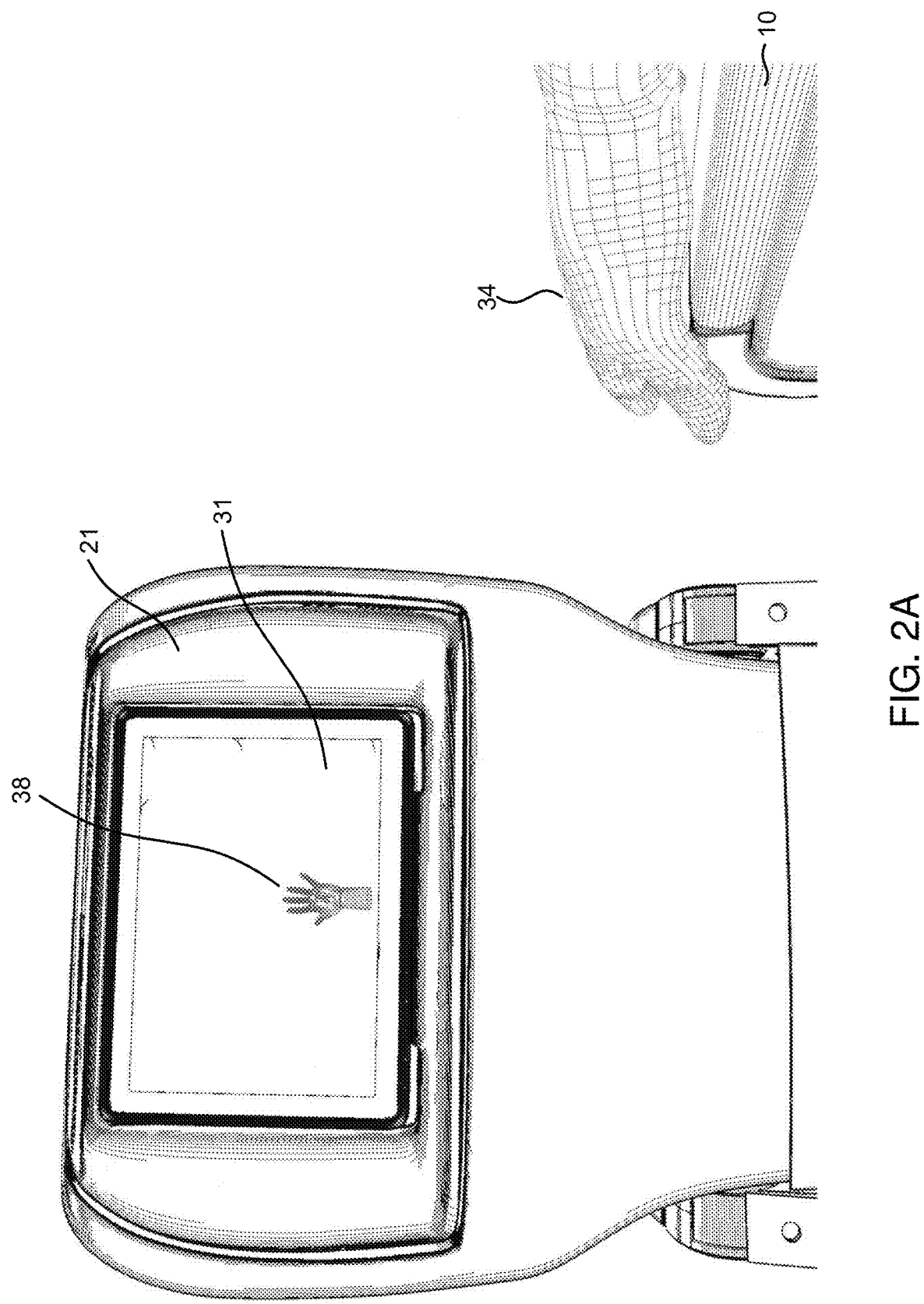
FIG. 2A shows an example of displaying a first hand gesture by the 3D hand tracking device, according to one aspect of the present disclosure.

FIG. 2A shows an example of presenting a first hand gesture by devices 10, 10A and 10C of FIGS. 1A, 1B and 1C, according to one aspect of the present disclosure. As described above, devices 10A and 10C are simply different variations of device 10. A 3D image 38 of a hand gesture 34 is shown within display 31 of a passenger seat device 21. The 3D image 38 is based on using the single camera device 10A of FIG. 1B or the dual camera device 10C of FIG. 1C.

When the 3D image is displayed, the user assist module 15 may present a tutorial on display screen 31 to train the user on how to use device 10. The tutorial is presented by playing a media file. This provides real-time feedback to a user.

It is noteworthy that the user's hand can be in contact with the device surface or located above the device. For example, the user may place an arm on the armrest 20, while using the device 10. This helps with reducing muscle fatigue. It is noteworthy that device 10 can be operated with just one hand. The gestures can be performed by either the left or right hand, and hence can accommodate both left and right handed users. Furthermore, since the gesture is displayed on the display 31, the use of device 10 becomes intuitive and self-explanatory, compared to conventional D-pad based systems. For user's that need help, as mentioned above, the user assist module 15 provides guidance with audio-video directions for using device 10.

Figure 2C:
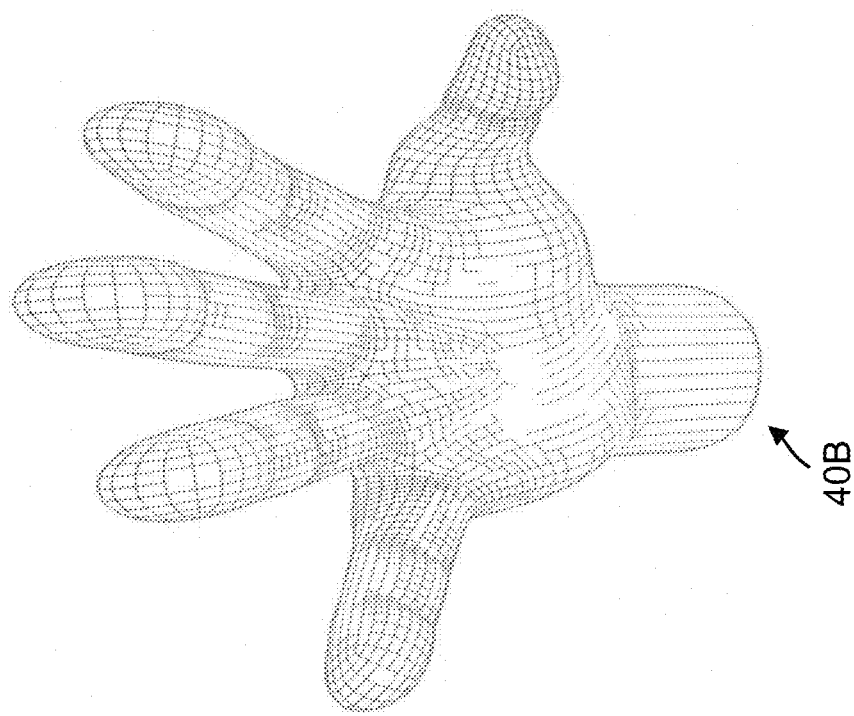
FIGS. 2B-2C show images of the first hand gesture, captured by the 3D hand tracking device of FIG. 1C, according to one aspect of the present disclosure.
Figure 2B:
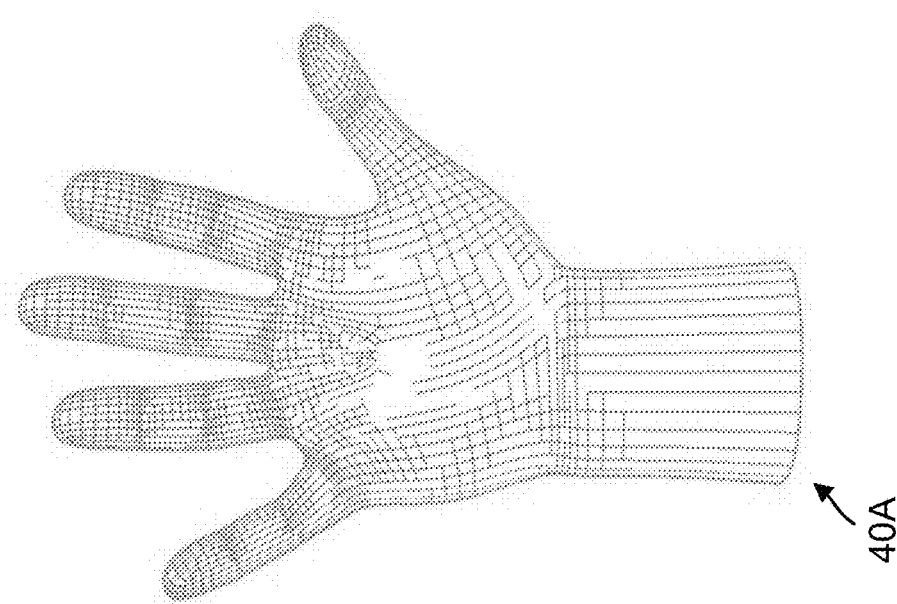

FIG. 2B shows an image 40A of the user hand making gesture 34 taken by the bottom camera 28 of device 10C (FIG. 1C). FIG. 2C shows an image 40B of the user hand making gesture 34 taken by the front camera 30 of device 10C. The images 40A and 4B are taken simultaneously from different angles and provided to the image processing module 14 to generate the displayed hand gesture 38.

Figure 2D:
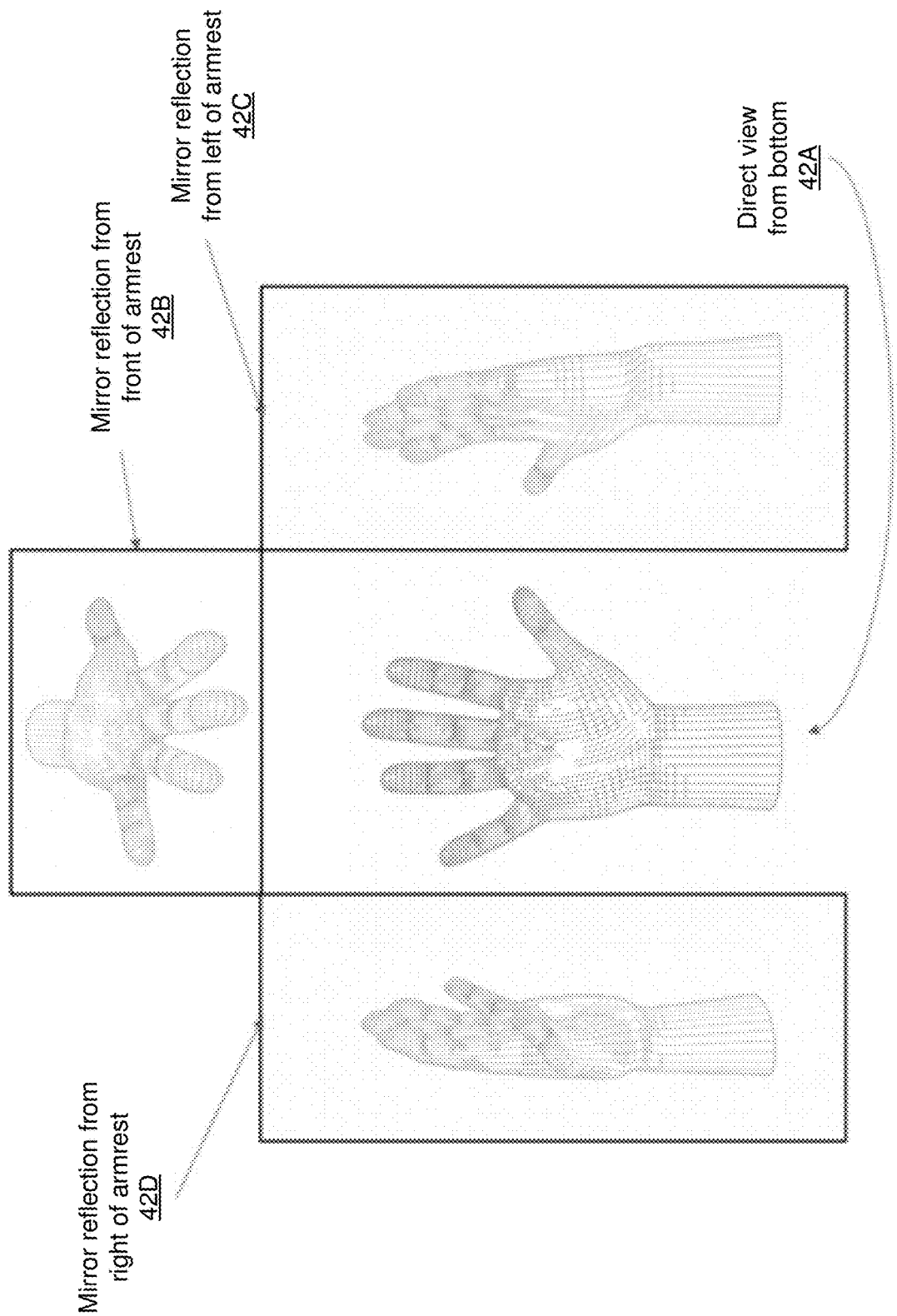
FIG. 2D shows images of the first hand gesture, captured by the 3D hand tracking device of FIG. 1B, according to one aspect of the present disclosure.

FIG. 2D shows a plurality of images 42A-42D taken simultaneously from different angles by the device 10A of FIG. 1B. Image 42A of the user hand is taken directly by the camera 22, while images 42B-42D are of the reflections at mirrors 24A-24C of the user hand making gesture 34. Images 42A-42D are used by the image processing module 14 to generate the displayed hand gesture 34 of FIG. 2A.

Figure 3A:
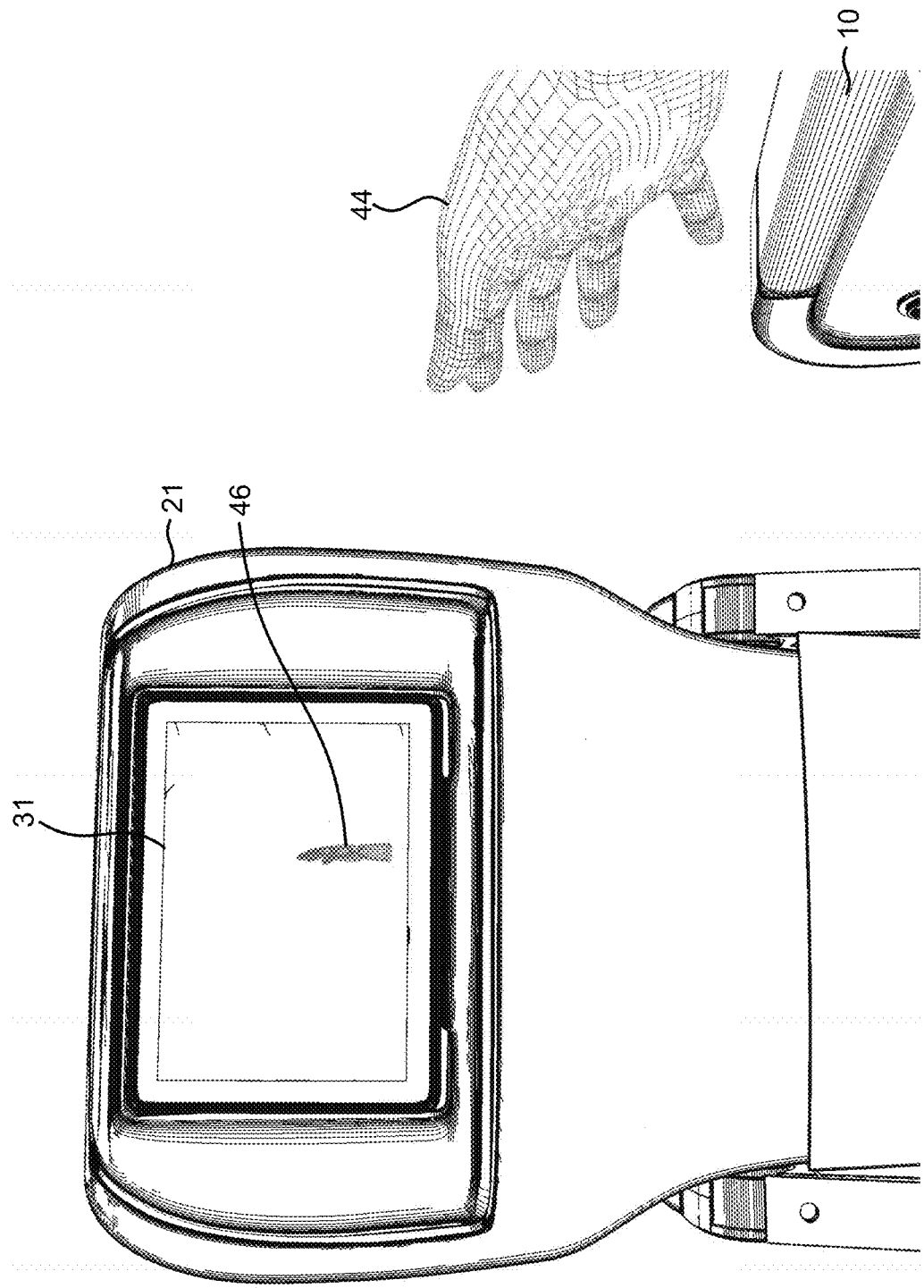
FIG. 3A shows an example of displaying a second hand gesture by the 3D hand tracking device, according to one aspect of the present disclosure.

FIG. 3A shows an example of presenting a second hand gesture by devices 10, 10A and 10C of FIGS. 1A, 1B and 1C, according to one aspect of the present disclosure. The example of FIG. 3A shows a user hand making a gesture 44 over device 10. A 3D image 46 of the user hand indicating gesture 44 is shown within display 31 of the seat device 21. The 3D image 46 is based on using the single camera device 10A of FIG. 1B or the dual camera device 10C of FIG. 1C.

When the 3D image is displayed, the user assist module 15 may present a tutorial on display screen 31 to train the user on how to use device 10. The tutorial is presented by playing a media file. This provides real-time feedback to a user.

It is noteworthy that the user's hand can be in contact with the device surface or located above the device. For example, the user may place an arm on the armrest 20, while using the device 10. This helps with reducing muscle fatigue. It is noteworthy that device 10 can be operated with just one hand. The gestures can be performed by either the left or right hand, and hence can accommodate both left and right handed users. Furthermore, since the gesture is displayed on the display 31, the use of device 10 becomes intuitive and self-explanatory, compared to conventional D-pad based systems. For user's that need help, as mentioned above, the user assist module 15 provides guidance with audio-video directions for using device 10.

Figure 3C:
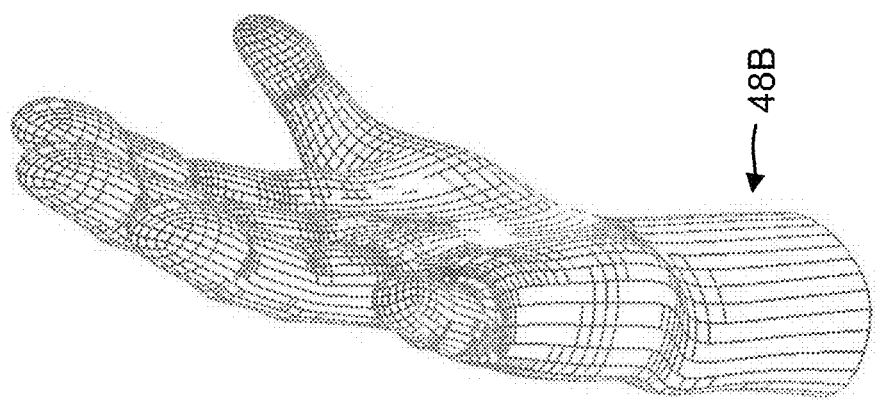
FIGS. 3B-3C show images of the second hand gesture, captured by the 3D hand tracking device of FIG. 1C, according to one aspect of the present disclosure.
Figure 3B:
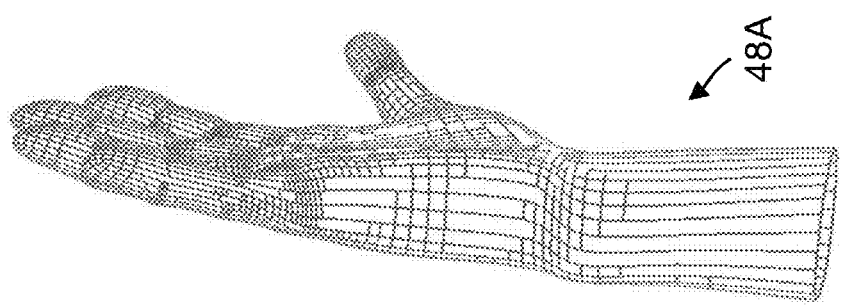

FIG. 3B shows an image 48A of the user hand taken by the bottom camera 28 of device 10C. FIG. 3C shows an image 48B of the user hand taken by the front camera 30 of device 10C. The hand images 48A and 48B are taken simultaneously from different angles and provided to the image processing module 14 to generate the displayed hand gesture image 46.

Figure 3D:
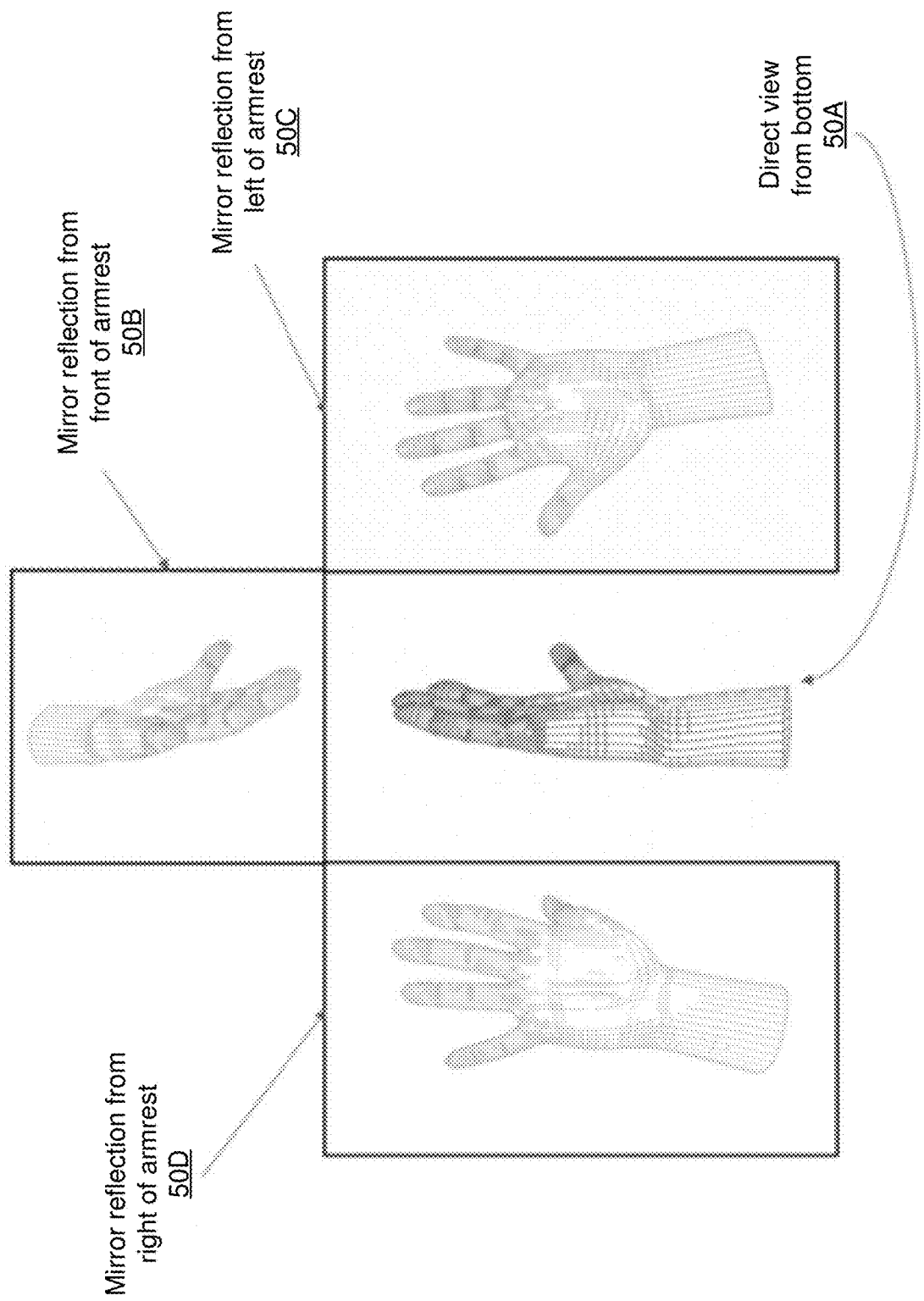
FIG. 3D shows images of the second hand gesture, captured by the 3D hand tracking device of FIG. 1B, according to one aspect of the present disclosure.

FIG. 3D shows the various images 50A-50D taken simultaneously from different angles by device 10A of FIG. 1B. Image 50A of the user hand making gesture 44 is taken directly by the camera 22, whiles images 50B-50D are based on the reflection of the hand at mirrors 24A-24C. Images 50A-50D are provided to the image processing module 14 to generate the image 46 of the hand gesture 44 of FIG. 3A.

Figure 4A:
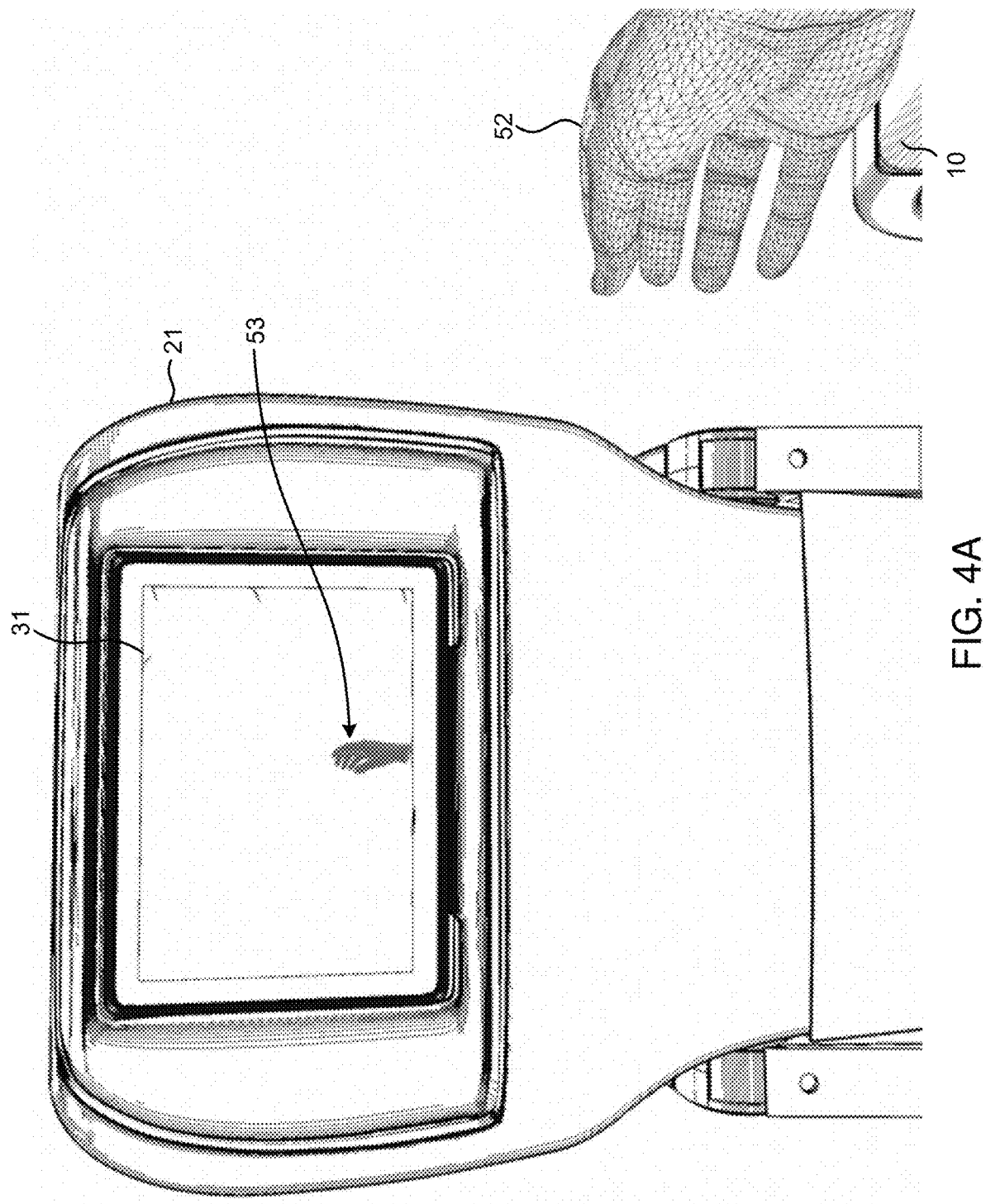
FIG. 4A shows an example of displaying a third hand gesture by the 3D hand tracking device, according to one aspect of the present disclosure.

FIG. 4A shows an example of presenting a third hand gesture by devices 10, 10A and 10C of FIGS. 1A, 1B and 1C, according to one aspect of the present disclosure. The example of FIG. 4A shows a hand gesture 52 of a user hand placed over device 10. A 3D image 53 of the user hand indicating the hand gesture 52 is shown within display 31 of the seat device 21. The 3D image 53 is based on using the single camera device 10A of FIG. 1B or the dual camera device 10C of FIG. 1C.

When the 3D image is displayed, the user assist module 15 may present a tutorial on display screen 31 to train the user on how to use device 10. The tutorial is presented by playing a media file. This provides real-time feedback to a user.

It is noteworthy that the user's hand can be in contact with the device surface or located above the device. For example, the user may place an arm on the armrest 20, while using the device 10. This helps with reducing muscle fatigue. It is noteworthy that device 10 can be operated with just one hand. The gestures can be performed by either the left or right hand, and hence can accommodate both left and right handed users. Furthermore, since the gesture is displayed on the display 31, the use of device 10 becomes intuitive and self-explanatory, compared to conventional D-pad based systems. For user's that need help, as mentioned above, the user assist module 15 provides guidance with audio-video directions for using device 10.

Figure 4C:
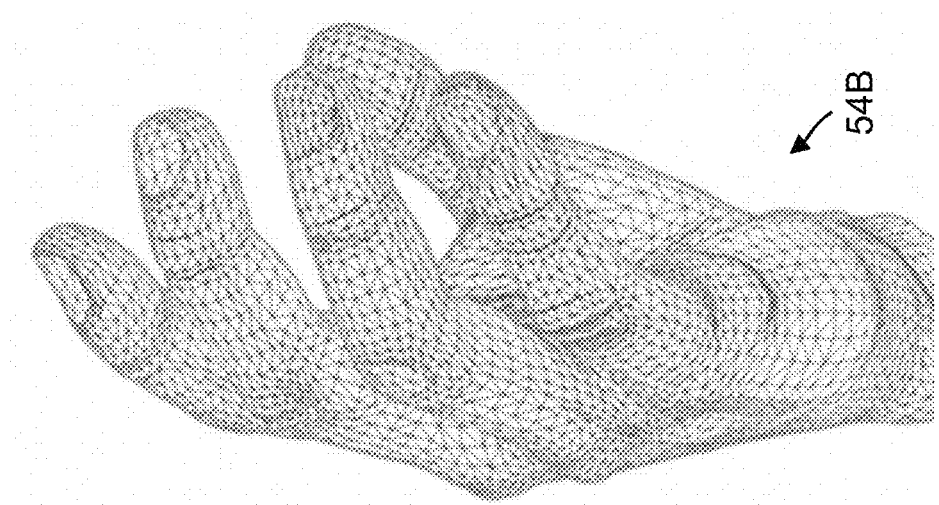
FIGS. 4B-4C show images of the third hand gesture, captured by the 3D hand tracking device of FIG. 1C, according to one aspect of the present disclosure.
Figure 4B:
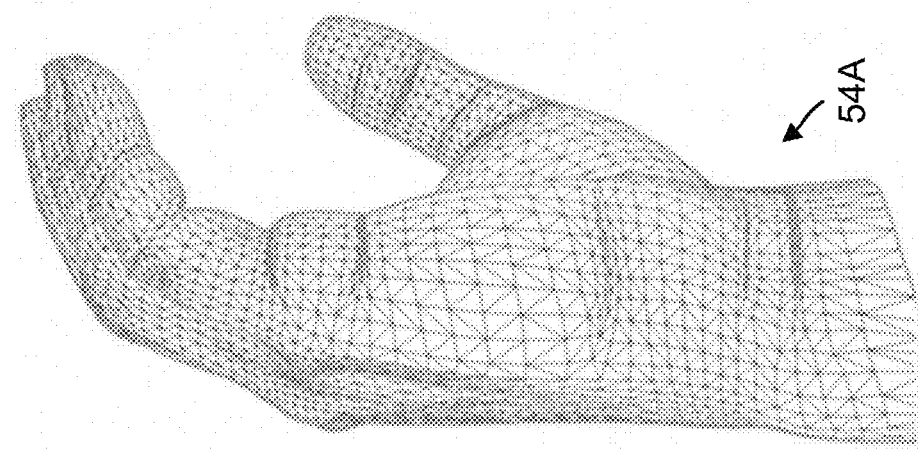

FIG. 4B shows an image 54A of the user hand making gesture 52 taken by the bottom camera 28 of device 10C. FIG. 4C shows an image 54B taken by the front camera 30 of device 10C. The images 54A and 54B are taken simultaneously from different angles and are provided to the image processing module 14 to generate the displayed image 53 of the hand gesture 52.

Figure 4D:
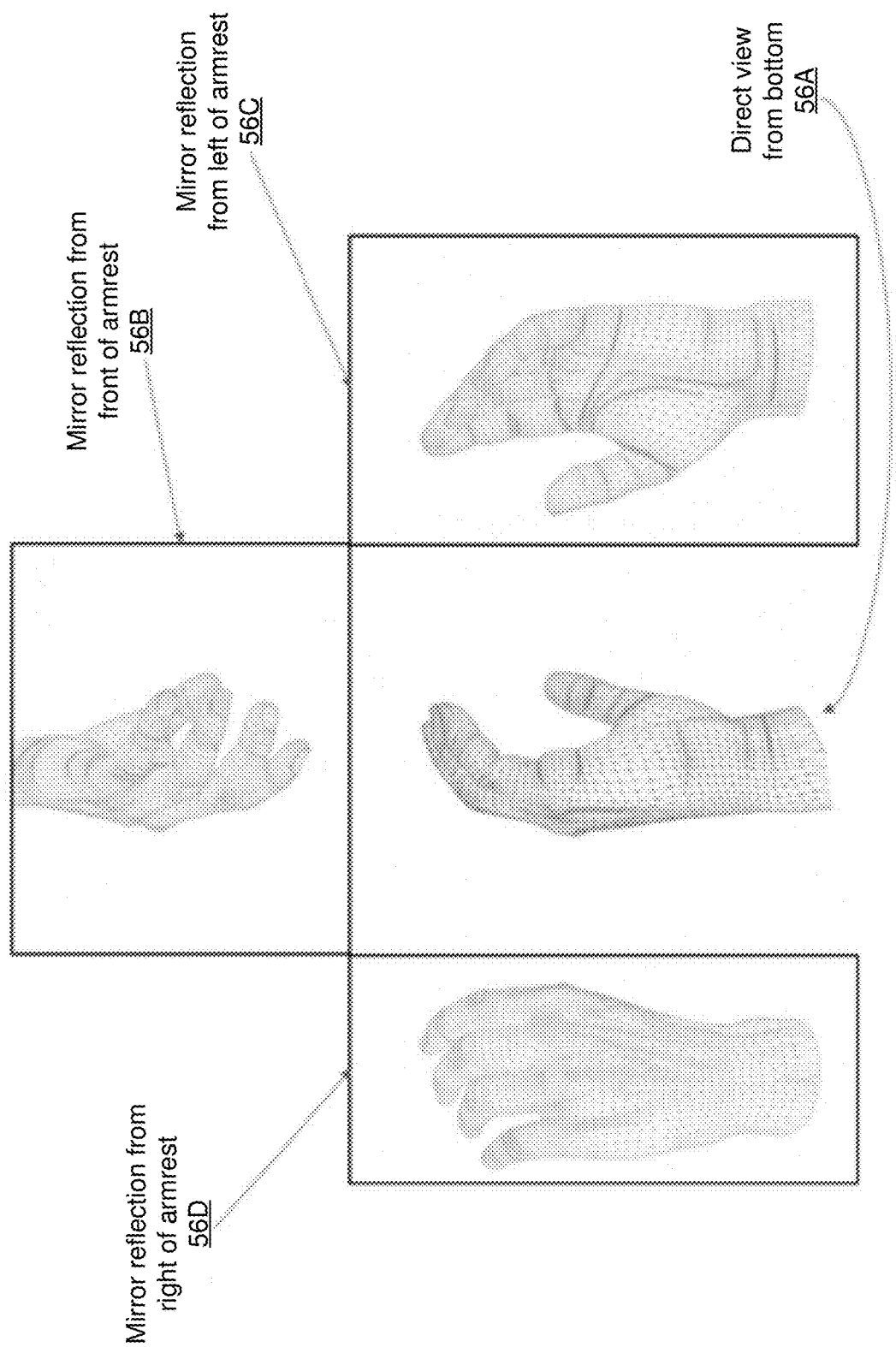
FIG. 4D shows images of the third hand gesture, captured by the 3D hand tracking device of FIG. 1B, according to one aspect of the present disclosure.

FIG. 4D shows a plurality of images 56A-56D taken simultaneously from different angles by device 10A of FIG. 1B. Image 56A of the user hand is taken directly by the camera 22, whiles images 56B-56D are based on the reflection of the hand at mirrors 24A-24C. Images 56A-56D are used by the image processing module 14 to generate the image 53 of the hand gesture 52 of FIG. 4A.

Figure 5A:
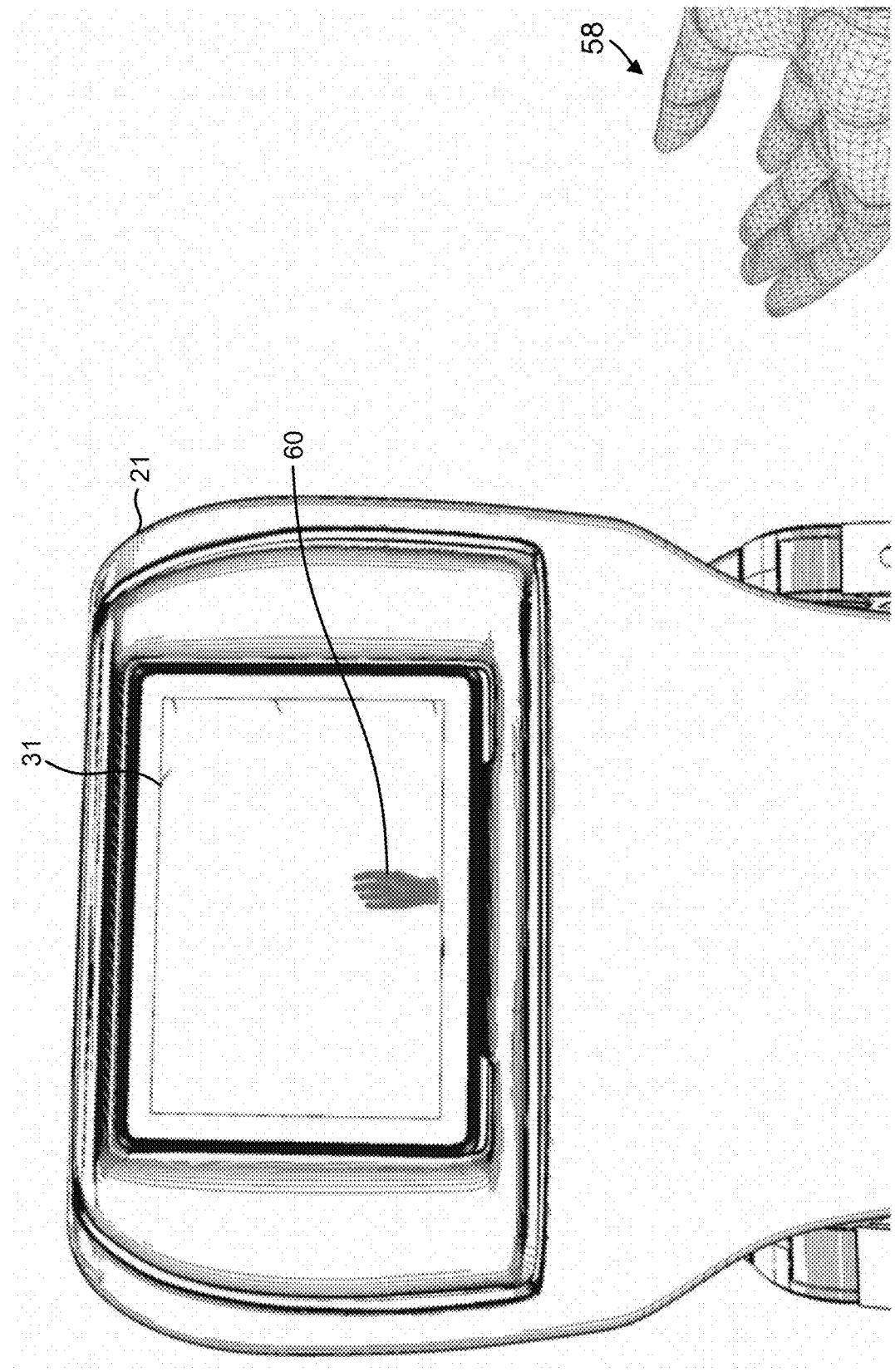
FIG. 5A shows an example of displaying a fourth hand gesture by the 3D hand tracking device, according to one aspect of the present disclosure.

FIG. 5A shows an example of presenting a fourth hand gesture by devices 10, 10A and 10C of FIGS. 1A, 1B and 1C, according to one aspect of the present disclosure. The example of FIG. 5A shows a hand gesture 58 of a user hand placed over device 10. A 3D image 60 of the hand gesture 58 is shown within display 31 of the seat device 21. The 3D image 60 is based on using the single camera device 10A of FIG. 1B or the dual camera device 10C of FIG. 1C.

When the 3D image is displayed, the user assist module 15 may present a tutorial on display screen 31 to train the user on how to use device 10. The tutorial is presented by playing a media file. This provides real-time feedback to a user.

It is noteworthy that the user's hand can be in contact with the device surface or located above the device. For example, the user may place an arm on the armrest 20, while using the device 10. This helps with reducing muscle fatigue. It is noteworthy that device 10 can be operated with just one hand. The gestures can be performed by either the left or right hand, and hence can accommodate both left and right handed users. Furthermore, since the gesture is displayed on the display 31, the use of device 10 becomes intuitive and self-explanatory, compared to conventional D-pad based systems. For user's that need help, as mentioned above, the user assist module 15 provides guidance with audio-video directions for using device 10.

Figure 5C:
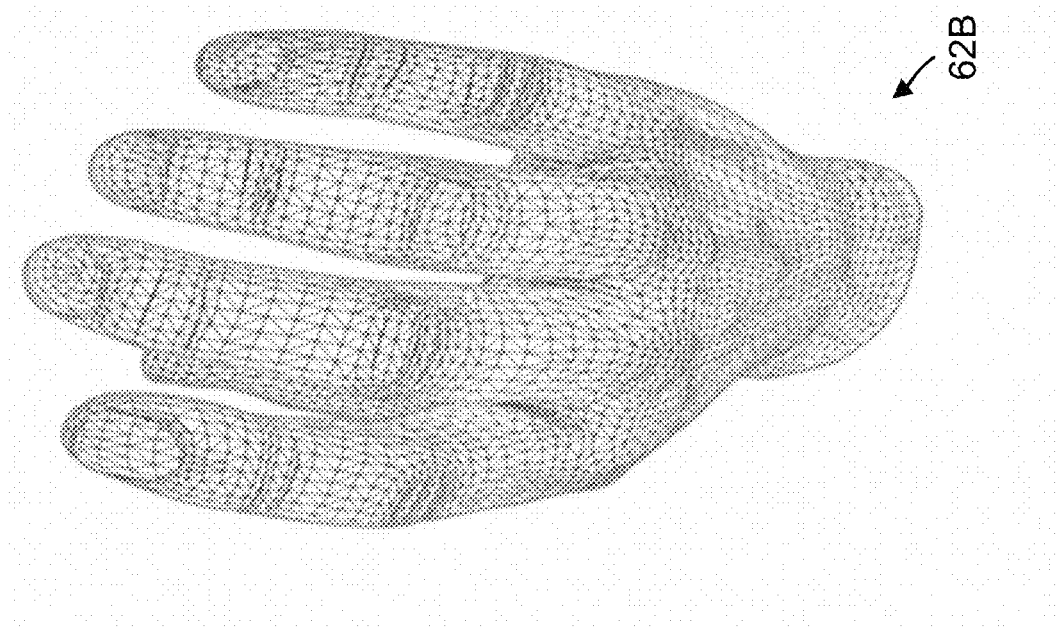
FIGS. 5B-5C show images of the fourth hand gesture, captured by the 3D hand tracking device of FIG. 1C, according to one aspect of the present disclosure.
Figure 5B:
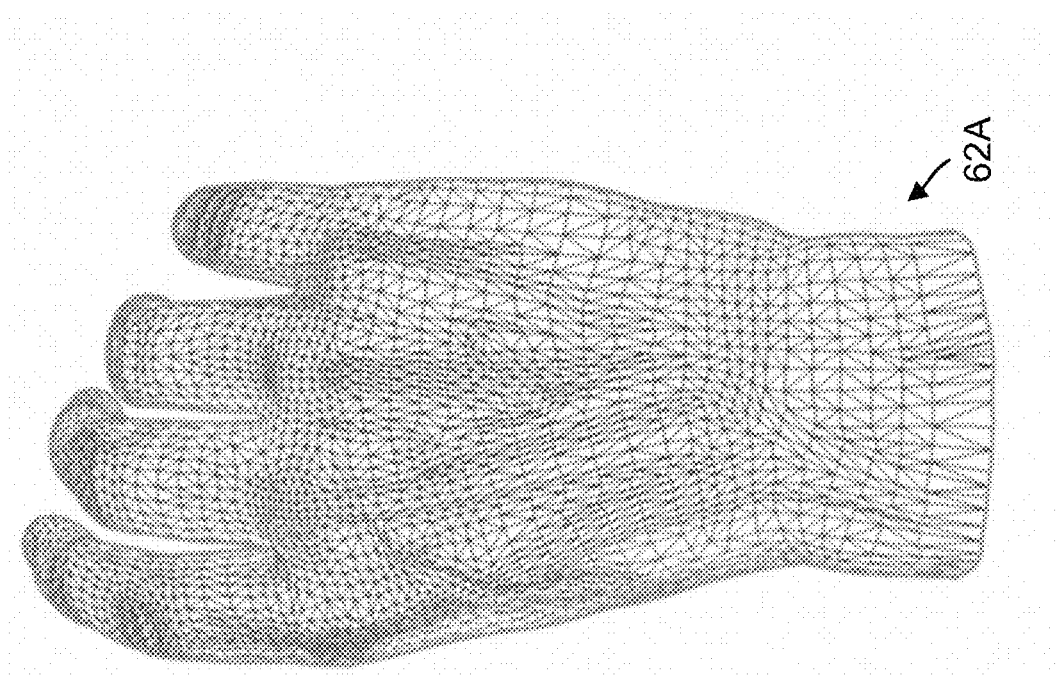

FIG. 5B shows an image 62A of the user hand taken by the bottom camera 28 of device 10C. FIG. 5C shows an image 62B taken by the front camera 30 of device 10C. The images 62A and 62B are taken simultaneously from different angles and provided to the image processing module 14 to generate the displayed image 60 of the hand gesture 58.

Figure 5D:
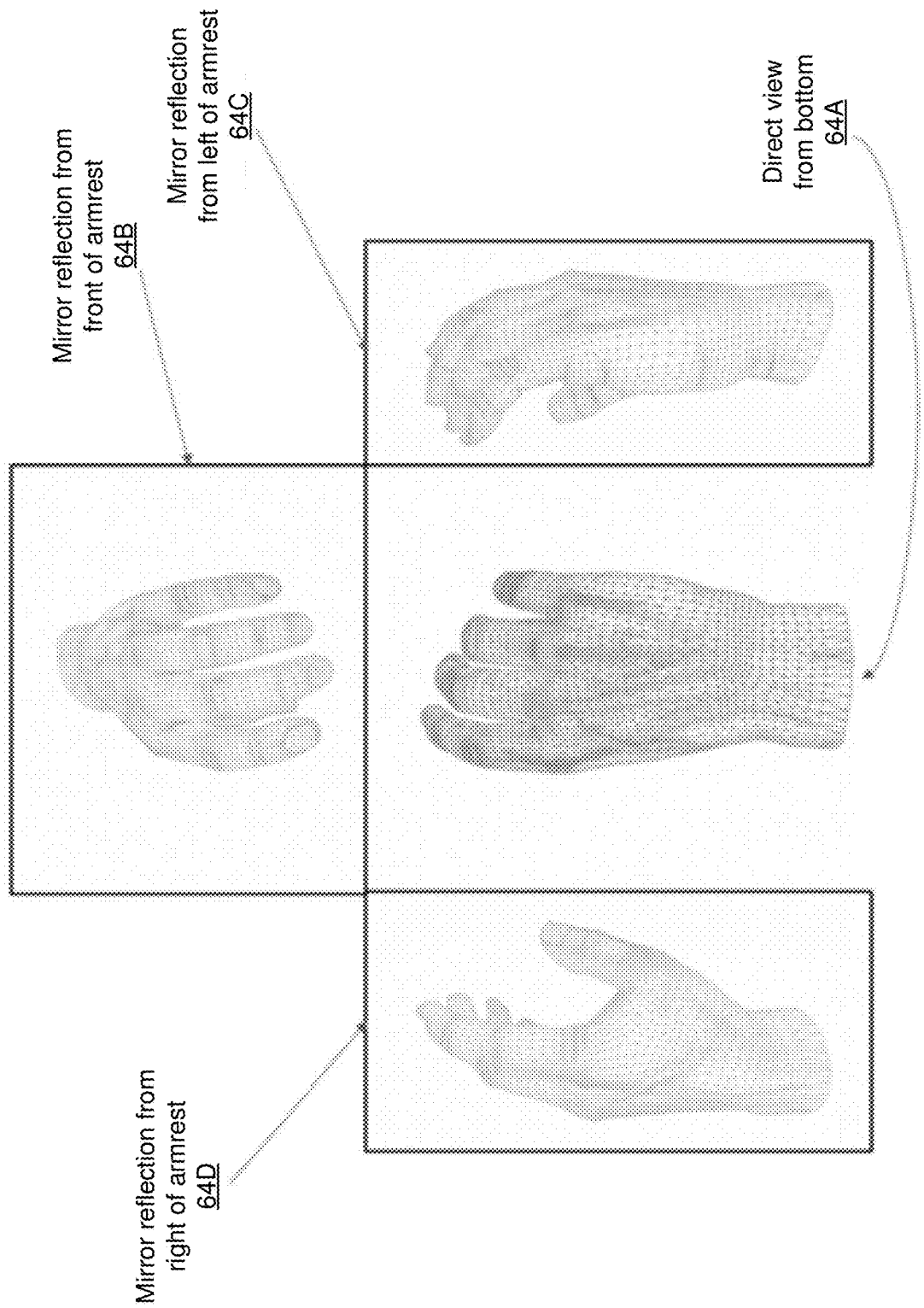
FIG. 5D shows images of the fourth hand gesture, captured by the 3D hand tracking device of FIG. 1B, according to one aspect of the present disclosure.

FIG. 5D shows a plurality of images 64A-64D of the user hand taken simultaneously from different angles by device 10A of FIG. 1B. Image 64A of the user hand is taken directly by the camera 22, while images 64B-64D are based on the reflection of the hand at mirrors 24A-24C, respectively. Images 64A-64D are used by the image processing module 14 to generate the image 60 of the hand gesture 58 of FIG. 5A.

Figure 6A:
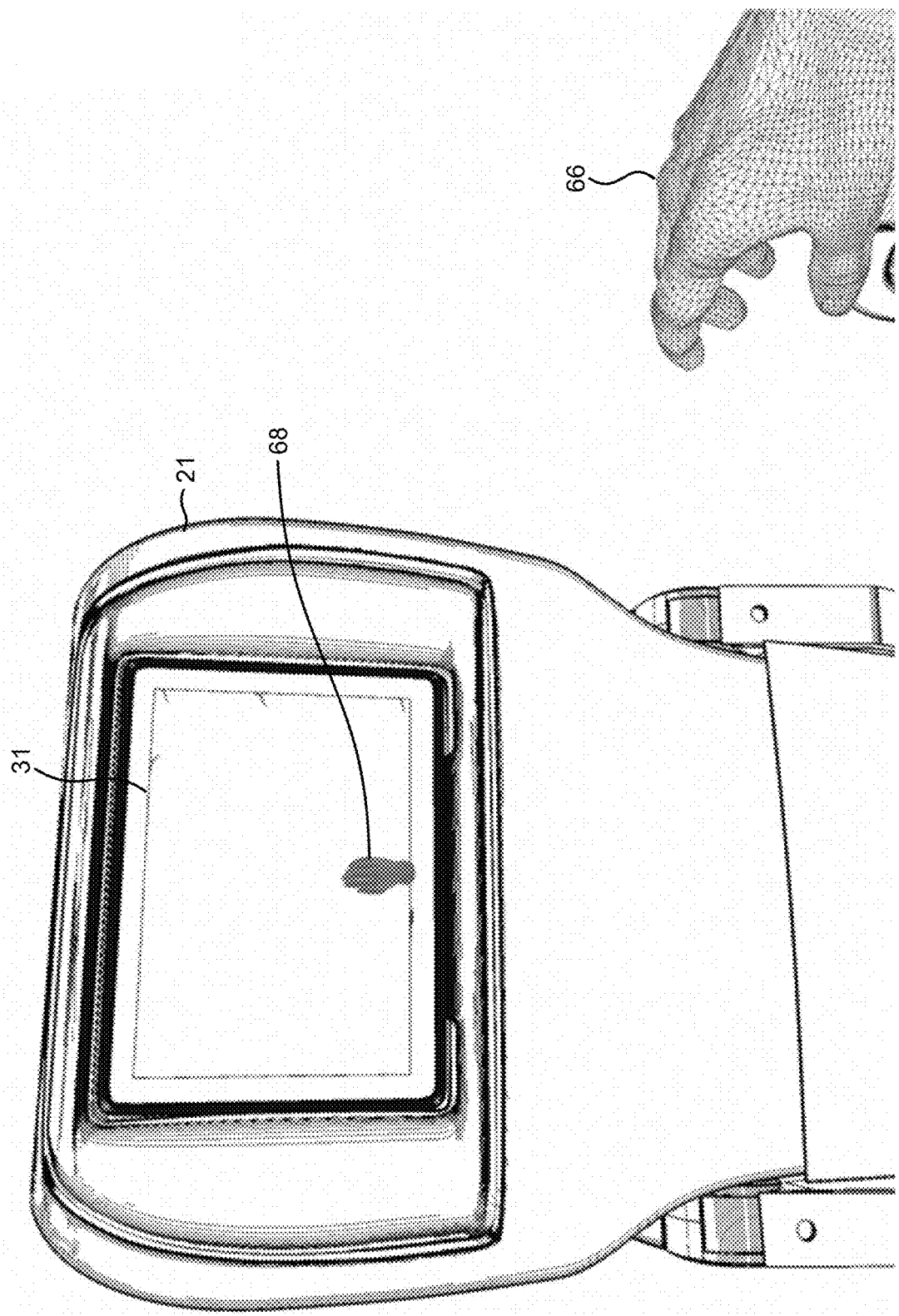
FIG. 6A shows an example of displaying a fifth hand gesture by the 3D hand tracking device, according to one aspect of the present disclosure.

FIG. 6A shows an example of presenting a fifth gesture by devices 10, 10A and 10C of FIGS. 1A, 1B and 1C, according to one aspect of the present disclosure. The example of FIG. 6A shows a hand gesture 66 of a user hand placed over device 10. A 3D image 68 of the user hand gesture is shown within display 31 of the seat device 21. The 3D image 68 is based on using the single camera device 10A of FIG. 1B or the dual camera device 10C of FIG. 1C.

When the 3D image is displayed, the user assist module 15 may present a tutorial on display screen 31 to train the user on how to use device 10. The tutorial is presented by playing a media file. This provides real-time feedback to a user.

It is noteworthy that the user's hand can be in contact with the device surface or located above the device. For example, the user may place an arm on the armrest 20, while using the device 10. This helps with reducing muscle fatigue. It is noteworthy that device 10 can be operated with just one hand. The gestures can be performed by either the left or right hand, and hence can accommodate both left and right handed users. Furthermore, since the gesture is displayed on the display 31, the use of device 10 becomes intuitive and self-explanatory, compared to conventional D-pad based systems. For user's that need help, as mentioned above, the user assist module 15 provides guidance with audio-video directions for using device 10.

Figures 6B, 6C:
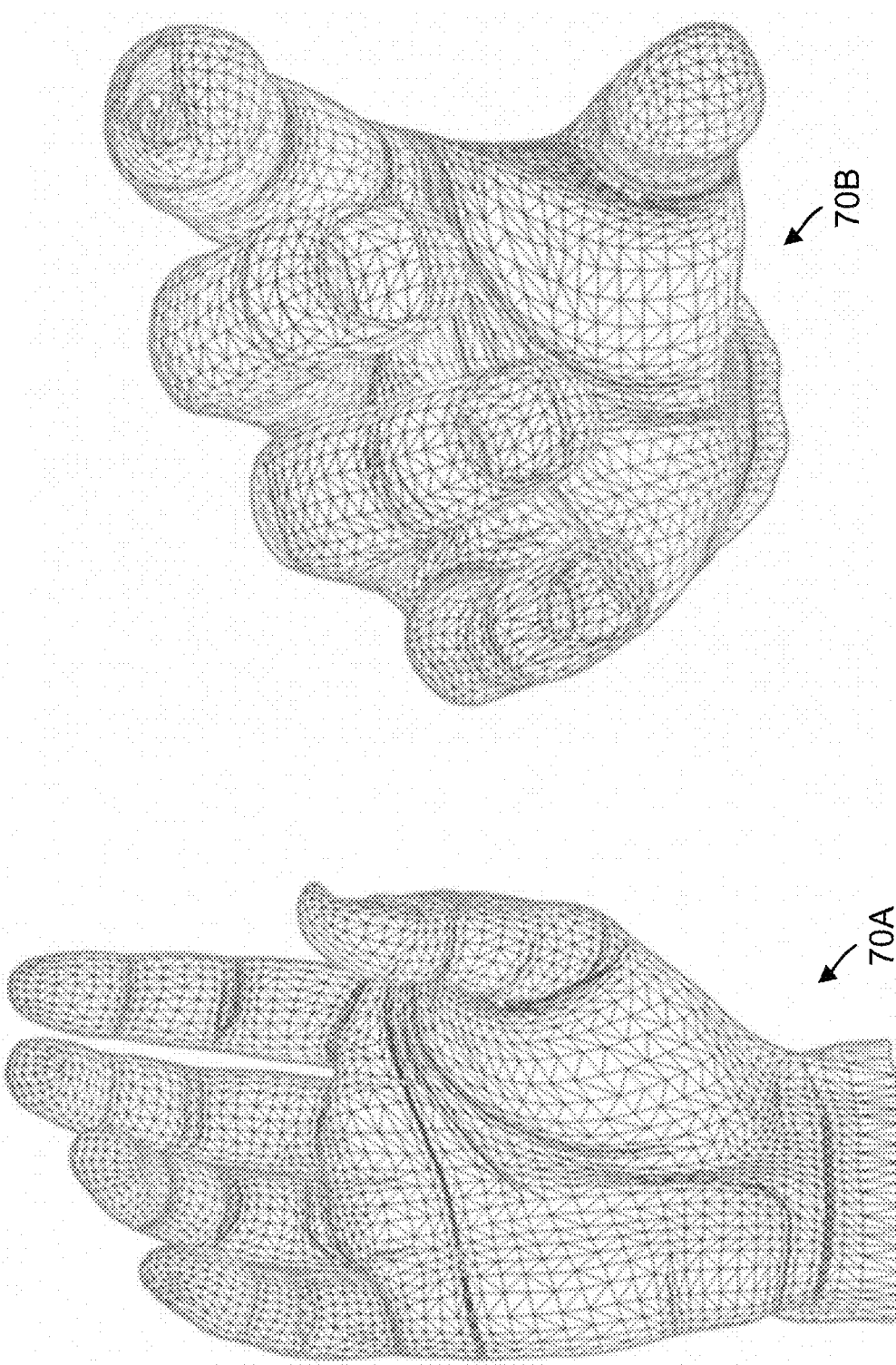
FIGS. 6B-6C show images of the fifth hand gesture, captured by the 3D hand tracking device of FIG. 1C, according to one aspect of the present disclosure.

FIG. 6B shows an image 70A of the user hand as taken by the bottom camera 28 of device 10C. FIG. 6C shows an image 70B taken by the front camera 30 of device 10C. The images 70A and 70B are taken simultaneously from different angles and provided to the image processing module 14 to generate the displayed image 68 of the gesture.

Figure 6D:
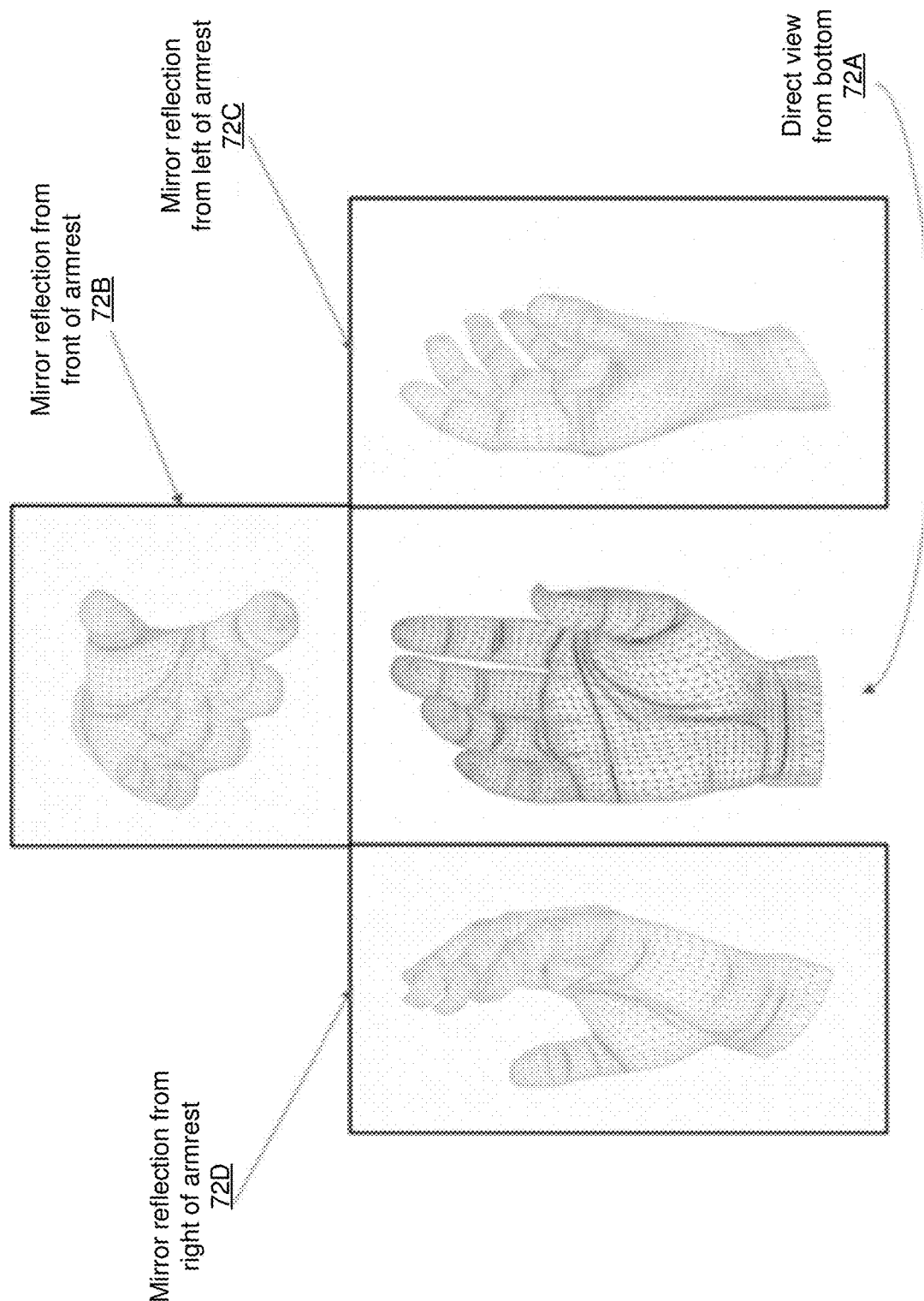
FIG. 6D shows images of the fifth hand gesture, captured by the 3D hand tracking device of FIG. 1B, according to one aspect of the present disclosure.

FIG. 6D shows the various images 72A-72D of the user hand taken simultaneously from different angles by device 10A of FIG. 1B. Image 72A is taken directly by the camera 22, while images 72B-72D are based on the reflection of the hand at mirrors 24A-24C, respectively. Images 72A-72D are used to generate the image of the hand gesture 68 of FIG. 6A.

Figures 7C, 7D:
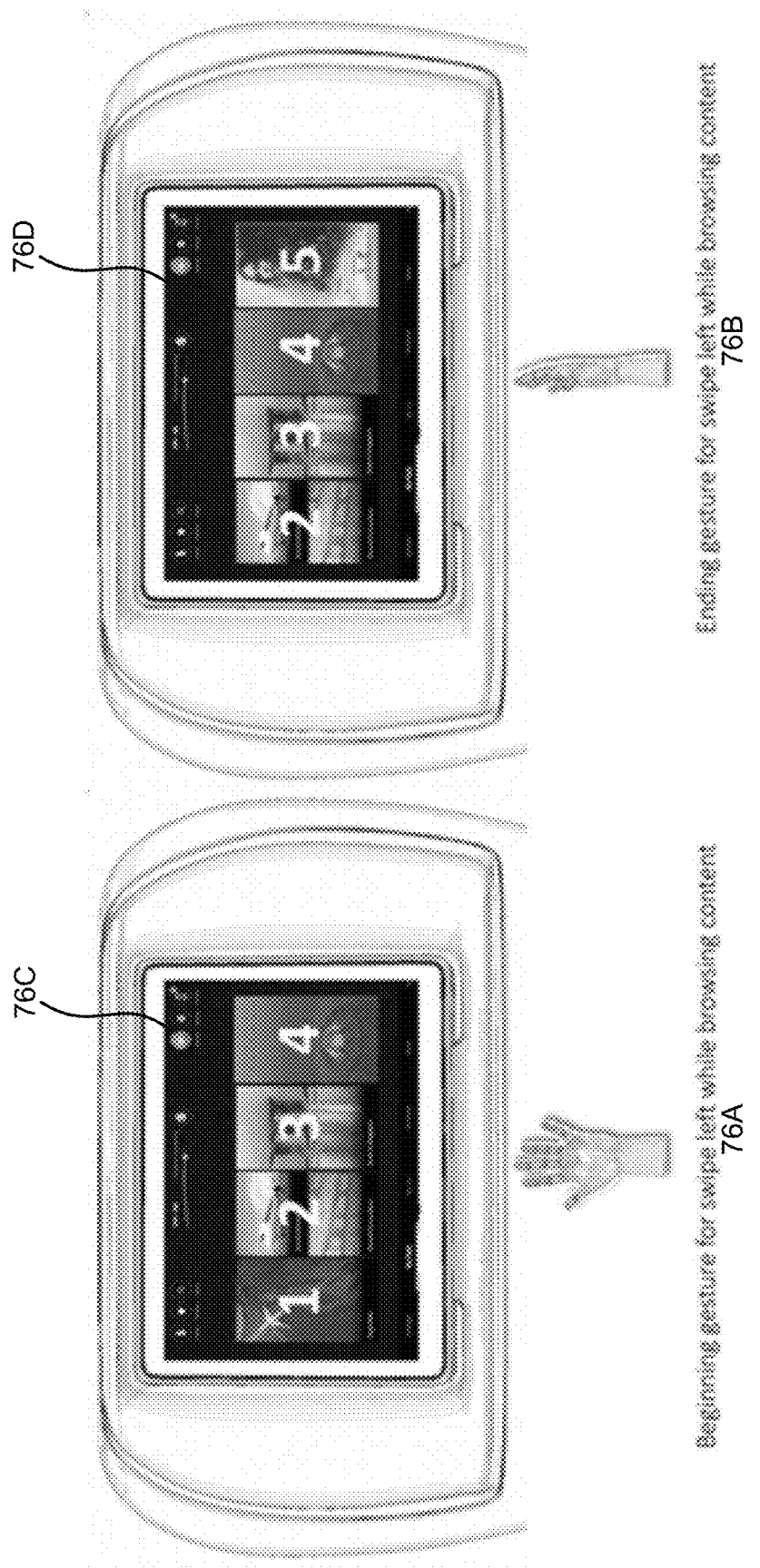
FIG. 7C shows a beginning gesture for browsing web content on a display device, according to one aspect of the present disclosure.
FIG. 7D shows an ending gesture for browsing web content on a display device, according to one aspect of the present disclosure.

FIGS. 7A-7J show examples of using the various hand gestures, described above. FIG. 7A shows the beginning of a gesture as 74A, and FIG. 7B shows the end of the gesture as 74B. Based on the gesture, the image 74C of FIG. 7A moves to the left as shown by the image 74D of FIG. 7B.

FIG. 7C shows the beginning of a gesture as 76A to browse web content 76C (or any other content provided by an entertainment system, a software application or any other system). FIG. 7D shows the end of the gesture as 76B. The web content 76C of FIG. 7C moves to the left as shown by the image 76D of FIG. 7D.

FIG. 7E shows the beginning of a gesture as 78A to zoom web content 78C (or any other content provided by an entertainment system, a software application or any other system). FIG. 7F shows the end of the gesture as 78B. The zoomed web content is shown as 78D.

FIG. 7G shows the beginning of a gesture as 80A to rotate displayed content 80C. FIG. 7H shows the end of the gesture as 80B. The rotated content is shown as 80D in FIG. 7H.

FIG. 7I shows the beginning of a gesture as 82A to flip displayed content 82C. FIG. 7J shows the end of the gesture as 82B. The flipped content is shown as 82D in FIG. 7J.

In one aspect, the technology disclosed above is able to merge a physical object (e.g. a user's hand) with digital objects on a screen in a "mixed reality" environment. In the mixed reality environment, physical and virtual objects interact in real-time, providing a more immersive experience for user's interacting with an IFE or any other system. Devices 10A/10C can be used as input devices for the mixed reality environment application programming interfaces (APIs) that are being developed to combine computer processing, human input and environment input.

Figure 8A:
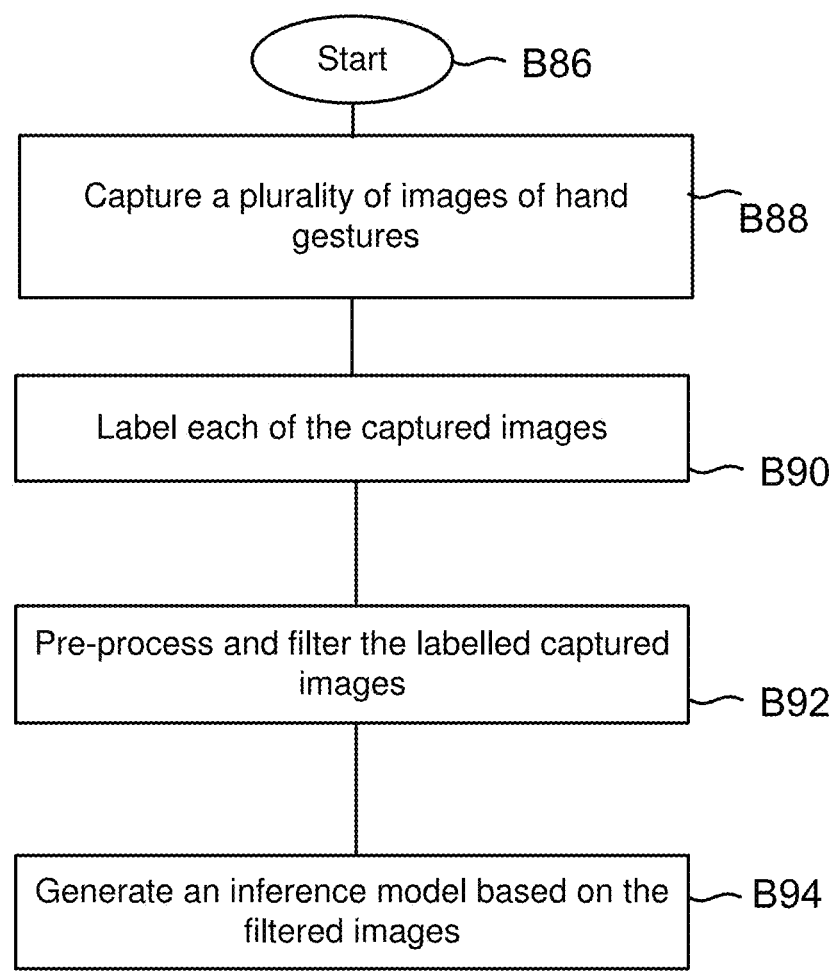
FIG. 8A shows a process flow diagram for generating an inference model (may also referred to as "a machine learning trained inference model", "a trained inference model", a "training model" or a "trained model"), according to one aspect of the present disclosure.

Process Flows: FIG. 8A shows a process flow 84 for generating the inference model 16 with the gesture inference model store 16A, according to one aspect of the present disclosures. Process 84 is executed by a computing system having at least a processor, a camera and a storage device. Process 84 begins in block B86, when the computing system is initialized. In one aspect, the computing system is configured to execute a convolutional neural network ("CNN") and recurrent neural network ("RNN"). In one aspect, as mentioned above, the inference model 16 may be referred to as a "trained model." It is noteworthy that other machine learning and neural network techniques can be used to implement the various process blocks of FIG. 8A, e.g. Logistic Regression and the Back Propagation Neural Network algorithms.

In block B88, a plurality of images for different hand gestures are captured. The images may be based on different hand structures to account for variation in the size of hand structures. In block B90, each image is labelled, and in block B92, the images are pre-processed that includes filtering the images to reduce noise, and removing any blind spots. In one aspect, in block B94, the inference model 16 is generated using the filtered images that are mapped to specific gestures. The inference model 16 (or a trained model) is stored at the gesture inference model store 16A.

Figure 8B:
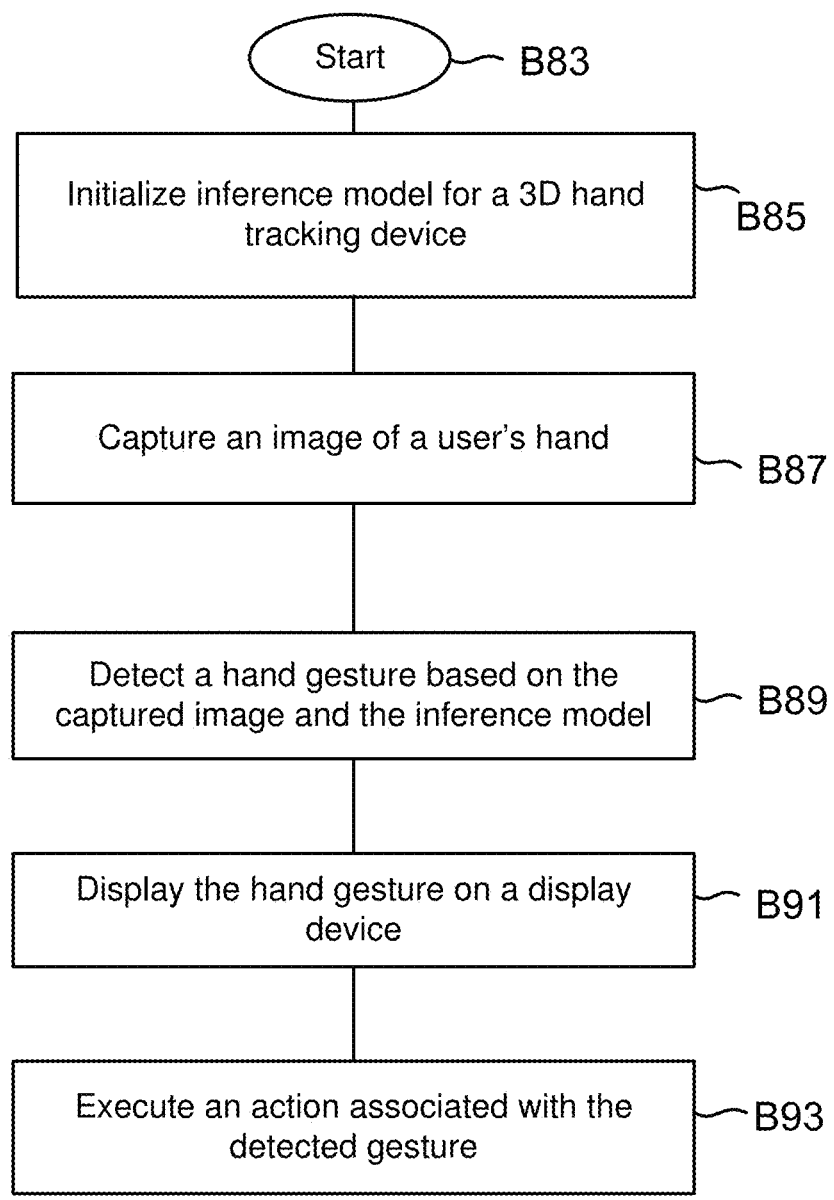
FIG. 8B shows a process flow diagram for using an inference model for a 3D hand tracking device, according to one aspect of the present disclosure.

FIG. 8B shows a process flow 96 for using the inference model 16 and detecting hand gestures, according to one aspect of the present disclosure. In one aspect, the process blocks of FIG. 8B are executed by the hand tracking device 10A or 10C of FIGS. 1B and 1C, respectively. Process 96 starts in block B83 after the inference model 16 with the gesture inference model store 16A has been generated using the process blocks of FIG. 8A. The inference model 16 is initialized in block B85 and is made accessible to device 10A and/or 10C. As mentioned above the inference model 16 maybe integrated with device 10A/10C or accessible to device 10A/10C.

In block B87, a plurality of images of a user's hand are captured from different angles. The images are captured by camera 22 of device 10A. A first image is taken directly by the camera 22 and other images are taken simultaneously based on the hand reflections at a plurality of mirrors. When device 10C is used, then the images are taken simultaneously by the bottom camera 28 and the front camera 30 at different angles. Examples of capturing the images are shown in FIGS. 2A-6D for different gestures, as described above in detail.

Based on the captured images, in block B89, the image processing module 14 detects a gesture. The gesture is detected from the gesture inference model store 16A that is periodically updated and maintained by the inference model 16. In block B91, the user hand gesture is displayed on the display device 21. It is noteworthy that when gesture cannot be detected, the user assist module 15 presents a media file to provide feedback to the user, so that the user can modify the hand movements for a recognizable gesture. The media file may be stored at a seat device, a server or device 10A/10C. Thereafter, in block B93, an action (or operation) associated with the gesture is executed. The action may involve browsing web based content, zooming an image, flipping or rotating an image, accessing a seat function control, e.g. adjusting seat lighting, calling an attendant, or any other function. It is noteworthy that the adaptive aspects described herein are not limited to any specific operation. Thereafter, the hand tracking device 10A/10C continues to monitor the user hand for detecting other gestures. The process is repeated for executing another operation associated with a next gesture.

In one aspect, device 10A/10C can be used to measure user heart rate by sensing changes in blood volume in the hand when device 10A/10C are used. The temperature variation or motion of the finger tips are used to correlate with a change in blood volume. Changes in user finger temperate may also be used to detect user alertness.

In another aspect, device 10A/10C may be used to trace letters or words with fingers. The tracing is used as input to a handwriting recognition algorithm, which in turn generates text on display device 21. The handwriting recognition algorithm may executed by module 14 or by a separate module (not shown) that interfaces with the output module 18.

In yet another aspect, since infrared used by the infrared cameras is in the non-visible spectrum, operating device 10A/10C does not create any distraction in a cabin where a user is sitting in the dark. Furthermore, privacy issues are minimized because device 10A/10C capture a thermal image compared to a regular image taken in the visible spectrum, and since device 10A/10C are integrated with an armrest, only data from the hand is captured. This limits privacy concerns that emanate from systems using regular camera images.

The technology disclosed herein provides a user friendly input device that reduces the inconvenience of traditional input devices that require raising a user's arm, to touch a display or pressing keys on a handset. Since the amount of motion used to operate devices 10A and/or 10C is minimal, device use reduces hand fatigue. This improves user travel experience on transportation vehicles.

In one aspect, a 3D hand tracking device is provided. The hand tracking device includes at least a first infrared camera for capturing a plurality of images of a user hand indicating a first gesture for requesting a first action associated with operating a display device. The hand tracking device utilizes the plurality of images to generate a three-dimensional image of the user hand; and detects the first gesture from the three-dimensional image using a trained model (or an inference model) that stores a plurality of input gestures corresponding to three-dimensional images of user hands. A first operation is executed in response to the detected first gesture. The hand tracking device continuously monitors the user hand to detect a second gesture from the trained model for executing a second operation.

In another aspect, a method for a hand tracking device is provided. The method includes capturing a plurality of images of a user hand by a first infrared camera and a second infrared camera of a hand tracking device interfacing with a display device, the user hand indicating a first gesture requesting a first action associated with operating the display device; utilizing the plurality of images by the hand tracking device to generate a three-dimensional image of the user hand; detecting by the hand tracking device the first gesture from the three-dimensional image, where the hand tracking device utilizes a trained model to detect the first gesture based on stored plurality of input gestures corresponding to three-dimensional images of user hands; and executing a first operation by the display device in response to the detected first gesture.

In another aspect, another method is provided for a hand tracking device. The method includes capturing a plurality of images of a user hand by an infrared camera of a hand tracking device interfacing with a display device, the user hand indicating a first gesture requesting a first action associated with operating the display device. The plurality of images include a first image of the user hand taken directly from the user hand by the infrared camera, and at least a second image that is based on a reflection of the user hand at one of a plurality of mirrors located in the hand tracking device. The method further includes detecting by the hand tracking device, the first gesture from a three-dimensional image generated from the plurality of images, where the hand tracking device utilizes a trained model to detect the first gesture based on stored plurality of input gestures, each gesture corresponding to one of a plurality three-dimensional images of user hands; executing a first operation by the display device in response to the detected first gesture; and monitoring the user hand by the hand tracking device using the first infrared camera and the plurality of mirrors to detect a second gesture from the trained model for executing a second operation.

Figure 9A:
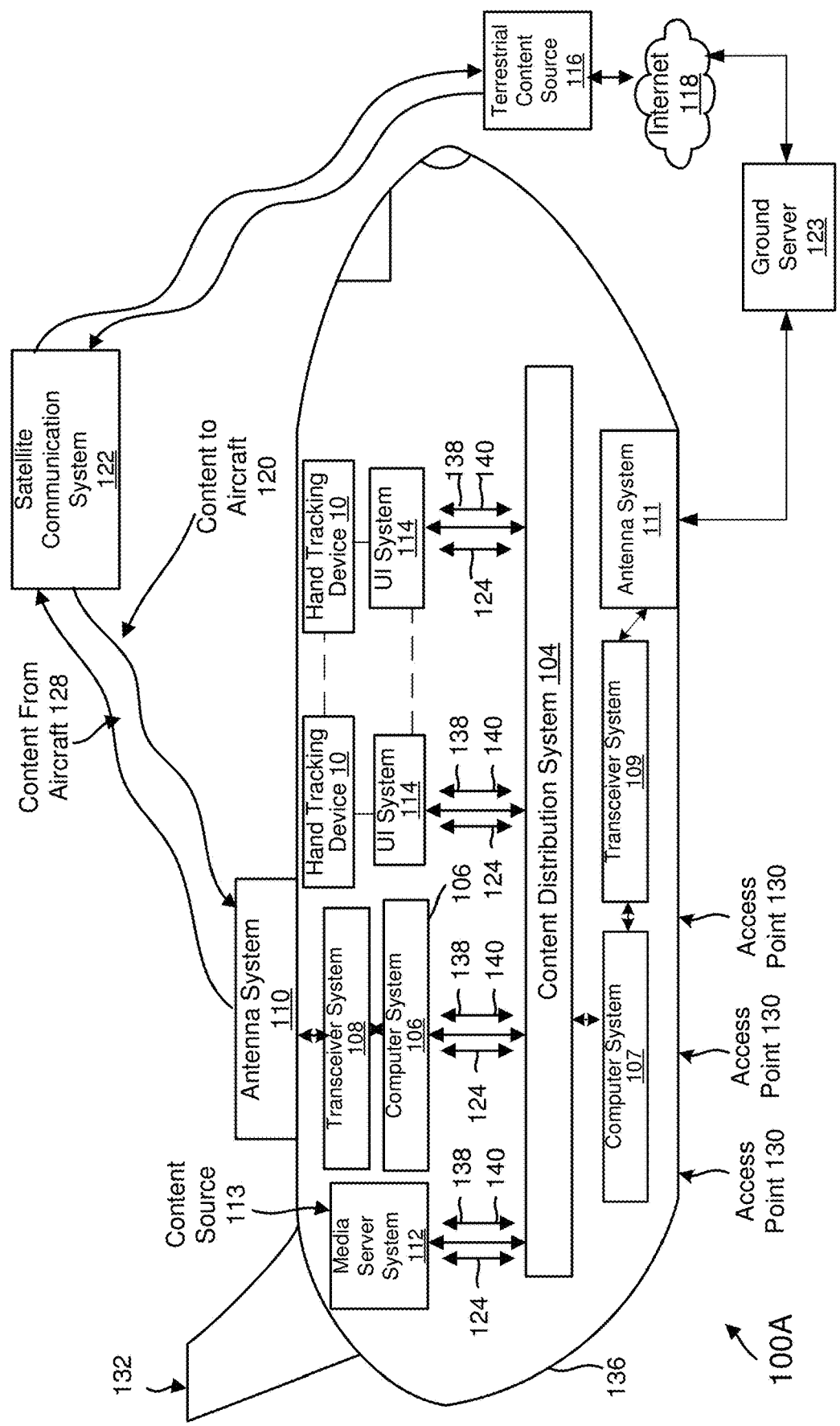
FIG. 9A shows an example of an operating environment for using the 3D hand tracking device on an aircraft, according to one aspect of the present disclosure.

Vehicle Information System:

FIG. 9A shows an example of a generic vehicle information system 100A (also referred to as system 100A) that can be configured for installation aboard an aircraft 132, according to one aspect of the present disclosure. In one aspect, system 100A deploys device 10 (i.e. 10A and/or 10C), to interface with seat devices.

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104 and interface with device 10. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content including a media file that provides feedback to users for using device 10. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground server (e.g. a cellular base station) 123 that communicates through an antenna 111 to a transceiver system 109, and a computer system 107 (similar to computer system 106). The functionality of computer system 107 is similar to computing system 106 for distributing content using the content distribution system 104 described herein. It is noteworthy that although two antenna systems 110/111 have been shown in FIG. 9A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground server 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a personal electronic device (PED), as desired. Although shown and described as being separate systems for purposes of illustration, the computer system 106 and the media server system 112 can be at least partially integrated.

The user interface system 114 may be computing terminals (or smart monitors) in communication with an access point 130. The user interface system 114 provides a display device (e.g. 31, FIG. 1A) to view content. The user interface system 114 includes a hardware interface to connect to an access point 130 that provides a wired and/or a wireless connection for the user interface system.

In at least one embodiment, the user interface system 114 comprises a software application that a user downloads and installs on a PED to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 interfaces with device 10 for permitting the user (or passenger) to communicate with system 100A, such as via an exchange of control signals 138. For example, device 10 can permit the user to input one or more user instructions 140 via hand gestures for controlling the operation of system 100A. Illustrative user instructions 140 from device 10A/10C can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 9B:
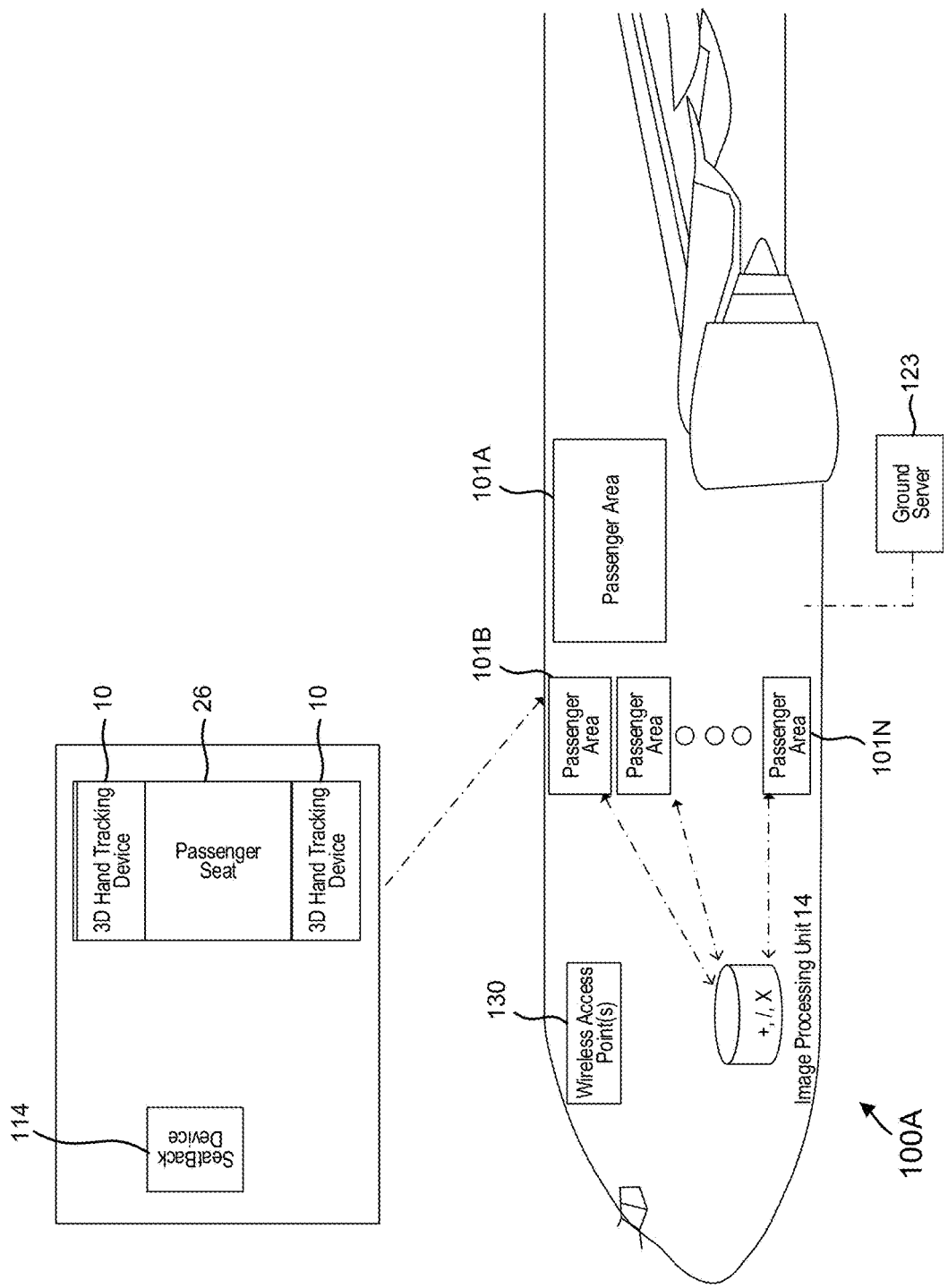
FIG. 9B shows a simplified example of an operating environment for using the 3D hand tracking device on an aircraft, according to one aspect of the present disclosure.

FIG. 9B shows a simplified version of system 100A, with passenger areas 101A-101N. Each passenger seat 26 may have one or more device 10 that interfaces with the seatback device 114 (or 21, FIG. 1A). The image processing unit (or module) 14 may be located at device 10, seat device 114 or media server 112 or at any other location.

Figure 9C:
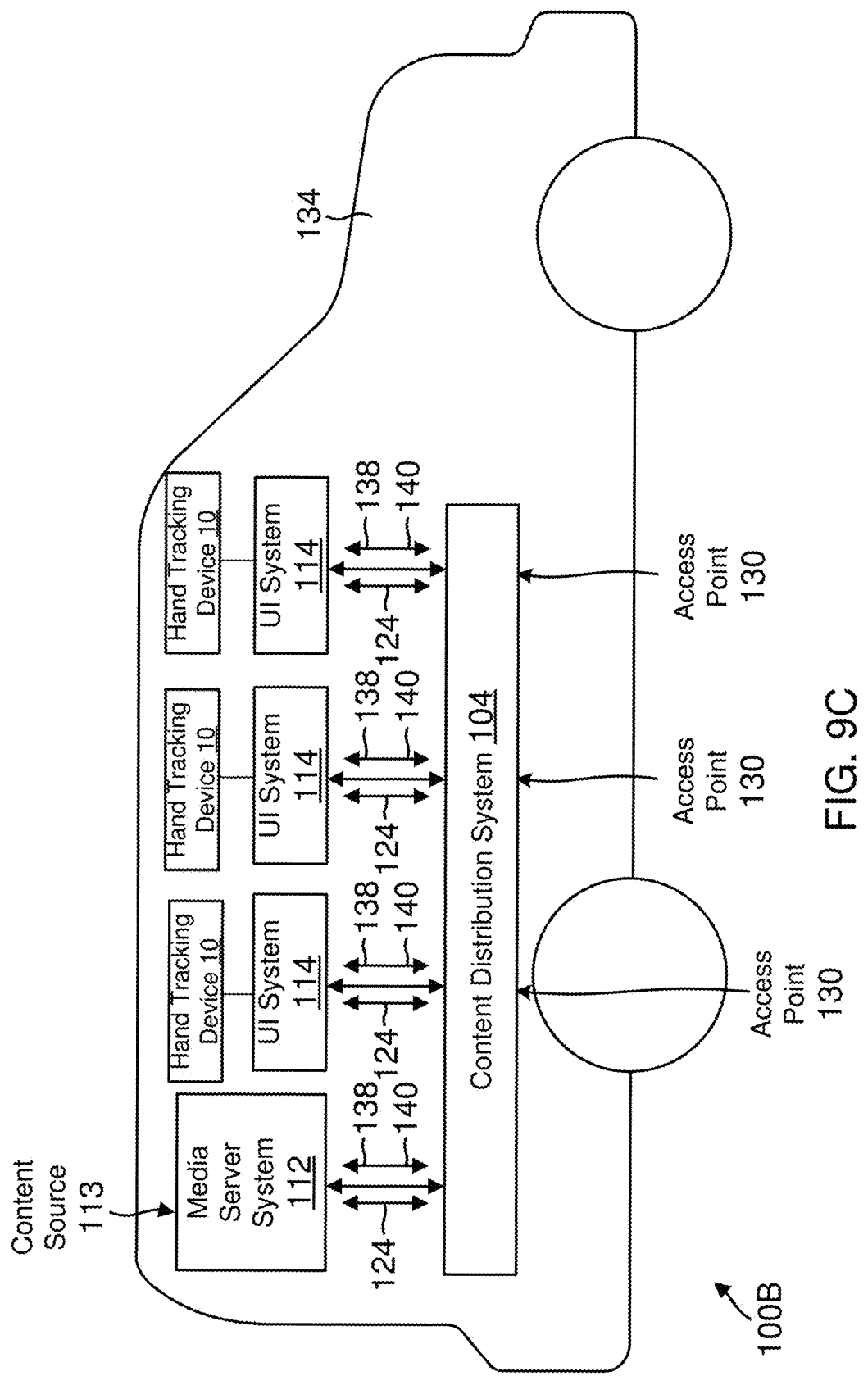
FIG. 9C shows an example of the operating environment on a non-aircraft transportation vehicle type for using the 3D hand tracking device, according to one aspect of the present disclosure.

FIG. 9C shows an example of implementing the vehicle information system 100B (may be referred to as system 100B) on an automobile 134 that may include a bus, a recreational vehicle, a boat, and/or a train, or any other type of passenger vehicle without limitation. The various components of system 100B are similar to the components of system 100A described above with respect to FIG. 9A, and for brevity are not described again.

Figure 9D:
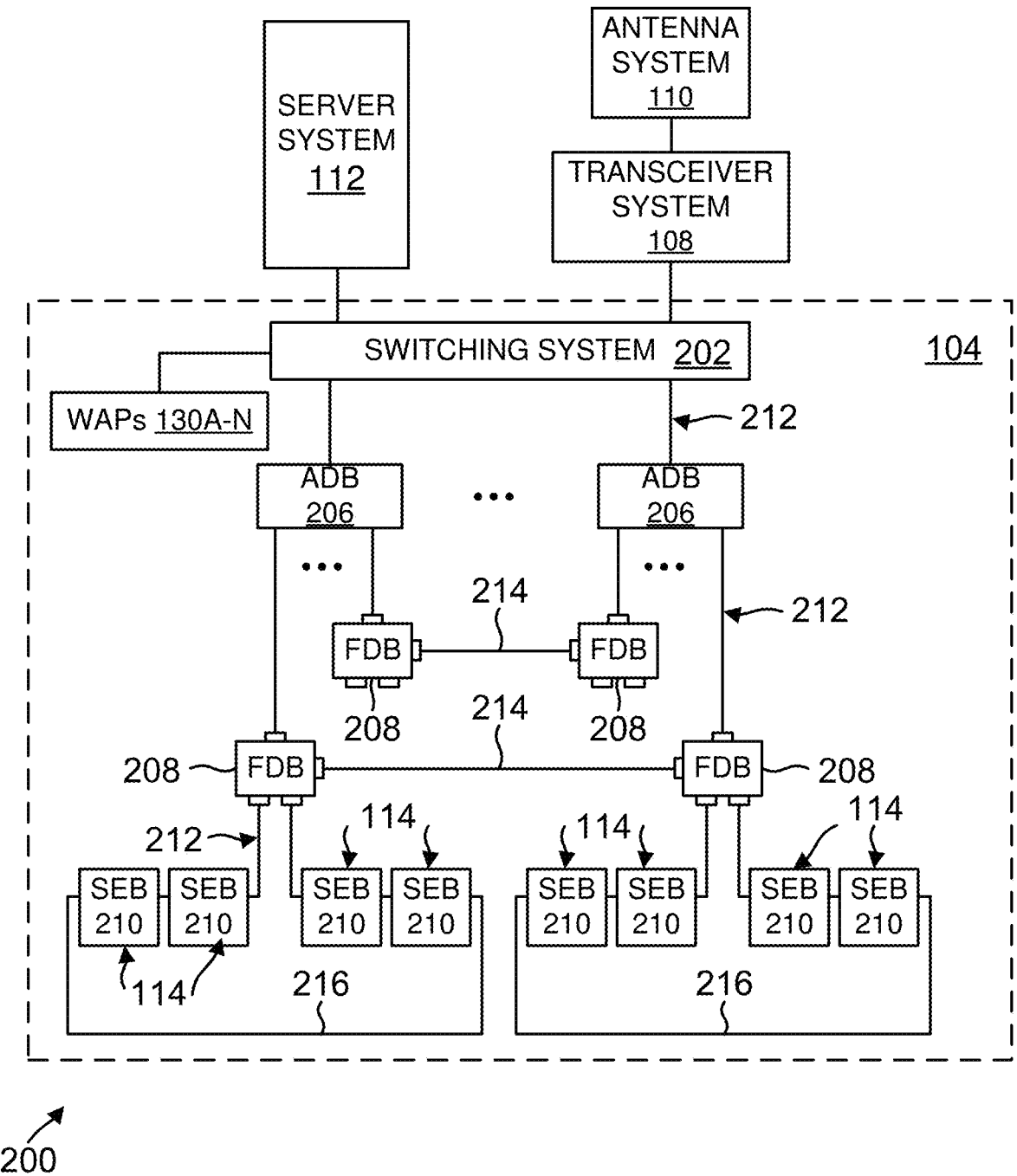
FIG. 9D shows an example of a content distribution system, used according to one aspect of the present disclosure.

Content Distribution System:

FIG. 9D illustrates an example of the content distribution system 104 for the vehicle information system 200 (similar to 100A/100B), according to one aspect of the present disclosure. The content distribution system 104 couples, and supports communication between the server system 112, and the plurality of user interface systems 114 that are controlled from device 10.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 9D, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 9D. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 9D. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 10:
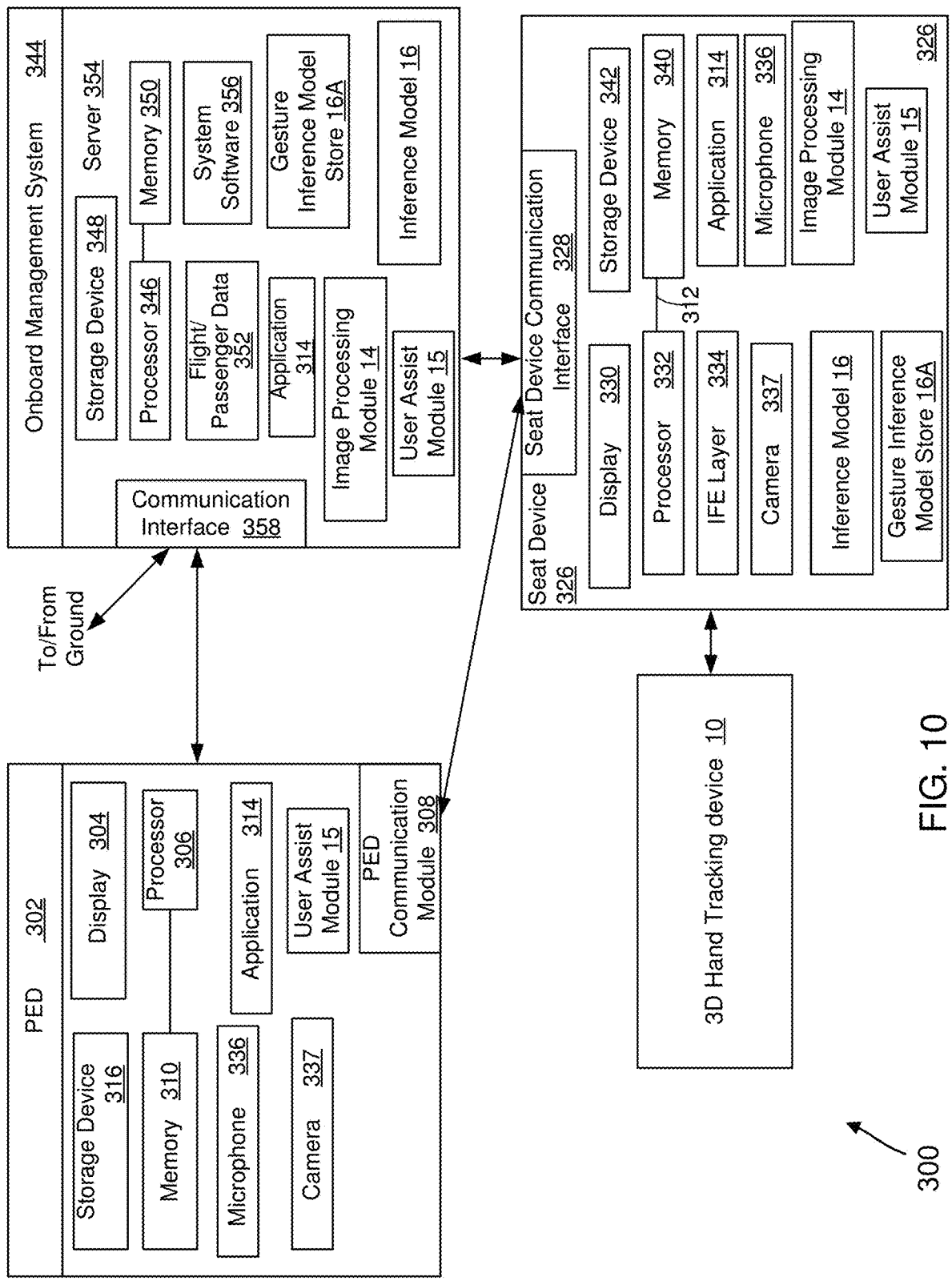
FIG. 10 shows an example of an overall system using the 3D hand tracking device on an aircraft, according to one aspect of the present disclosure.

System 300:

FIG. 10 shows an example of a system 300 for using device 10 on an aircraft (or any other transportation vehicle), according to one aspect of the present disclosure.

In one aspect, system 300 includes, an onboard management system 344, a seat device 326 interfacing with device 10, and a PED 302. The onboard management system 344 may be similar to computer system 106 and/or server 112 described above with respect to FIGS. 1A/1B.

In one aspect, the onboard management system 344 includes a server 354 (similar to the media server 112 and/or computer system 106/107). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, applications and program files, including system software 356, an application 314, the user assist module 15, the image processing module 14, inference model 16 with the gesture inference model store 16A, a media file used by module 15 to provide feedback to users of device 10 and others). The user assist module 15 and the inference model 16 with the gesture inference model store 16A may be downloaded by seat device 326 and/or PED 302 from server 354.

In one aspect, system software 356 is executed by the processor 346 to control the overall operation of the server 354. Application 314 may be downloaded from server 354 by passengers using an authorized PED 302 for accessing digital content.

In one aspect, the onboard management system 344 maintains flight and passenger data 352 (may also be referred to as data 352), for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, and any other information that can uniquely identify the passengers.

In one aspect, server 354 communicates with PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 9A-9D.

In one aspect, the seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and videos and the microphone may be used for receiving voice input.

In one aspect, the seat device 326 receives user input/requests via device 10 described above in detail. Device 10 enables a user to interact with content presented via display 330 (similar to display 31, FIG. 2A).

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options to users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 includes the inference model 16 and the gesture inference model store 16A. The image processing module 14 receives images from device 10 to detect a hand gesture, as described above. The user assist module 15 provides audio/video/text instructions for using device 10 by playing a media file (not shown).

In another aspect, the seat device 326 may also execute the application 314 that may be used by the passenger to view media content or various computing functions that are enabled by the seat device 326. The application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 9A/9C. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the PED 302 is paired with the seat device 326. The PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may include a microphone 336 for receiving a voice input from a passenger. The voice input is converted into text by an application 314 for processing. In another aspect, PED 302 also includes a camera 337 that may be used by a passenger to upload a video.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302 when used by a passenger.

The storage device 316 may also store the application 314 that is executed out of memory 310. Application 314 may be used to pair the PED 302 with the aircraft systems to receive content.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with the seat device 326 and/or server 354, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In another aspect, PED 302 executes the user assist module 15 to provide audio/video/text instructions for using device 10.

Figure 11:
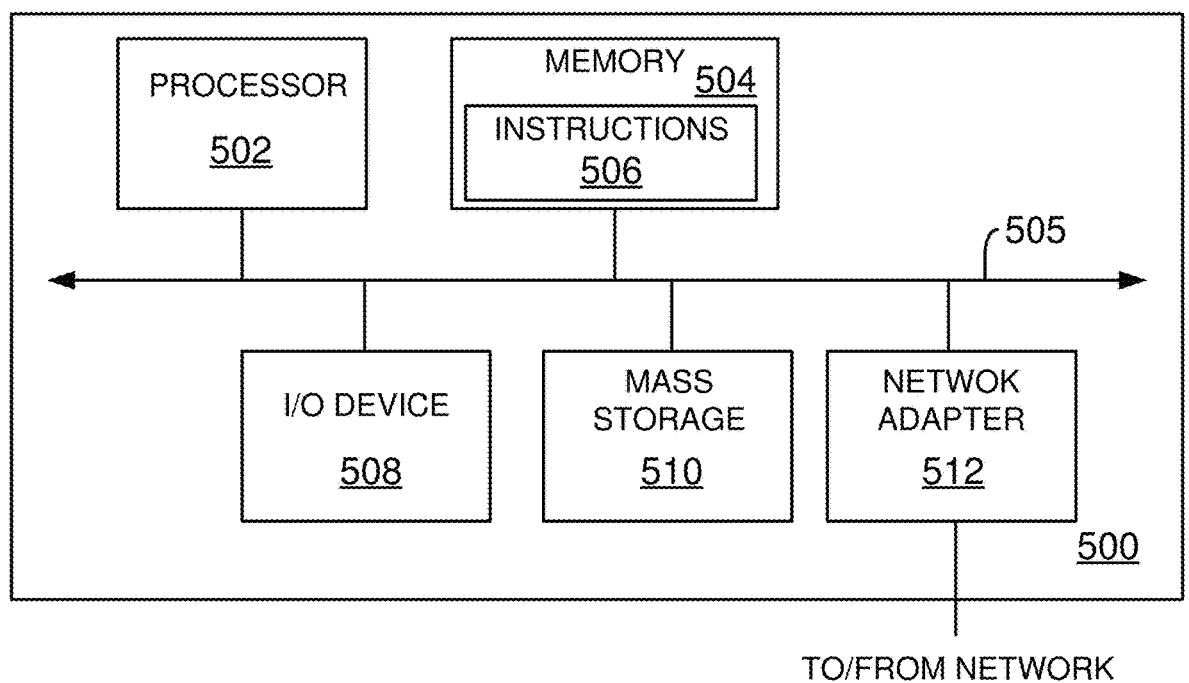
FIG. 11 shows a block diagram of a computing system, used according to one aspect of the present disclosure.

Processing System:

FIG. 11 is a high-level block diagram showing an example of the architecture of a processing system 500 that may be used according to one aspect. The processing system 500 can represent a computing device for generating the inference model 16, seat device 326, the ground server 123, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 11.

The processing system 500 includes one or more processor(s) 502 and memory 504, coupled to a bus system 505. The bus system 505 shown in FIG. 11 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the inference model 16, module 14, and/or the process steps of FIGS. 8A-8B described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, innovative technology for input devices have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
capturing a plurality of images of a user hand by an infrared camera of a hand tracking device interfacing with a display device, the user hand indicating a first gesture requesting a first action associated with operating the display device;
wherein the plurality of images include a first image of the user hand taken directly from the user hand by the infrared camera, and at least a second image that is based on a reflection of the user hand at one of a plurality of mirrors located in the hand tracking device;
wherein the plurality of mirrors includes a first mirror and a second mirror and a third mirror, the first mirror and the second mirror are located across from each other and oriented in a vertical direction from a first surface that includes the infrared camera;
detecting by the hand tracking device, the first gesture from a three-dimensional image generated from the plurality of images;
wherein the hand tracking device utilizes a trained model to detect the first gesture based on stored plurality of input gestures, each gesture corresponding to one of a plurality three-dimensional images of user hands;
executing a first operation by the display device in response to the detected first gesture; and
monitoring the user hand by the hand tracking device using the infrared camera and the plurality of mirrors to detect a second gesture from the trained model for executing a second operation.

2. The method of claim 1, wherein the infrared camera is located at a bottom surface of the hand tracking device to take the first image.

3. The method of claim 1, wherein the plurality of images, the first gesture and the second gesture are used to update the trained model.

4. The method of claim 1, wherein the plurality of images are captured by the infrared camera and another infrared camera, the infrared camera and the other infrared camera located at different surfaces of the hand tracking device at different elevations within the hand tracking device.

5. The method of claim 1, wherein the third mirror is located adjacent to the first mirror and the second mirror, and oriented in a vertical direction from a bottom surface of the hand tracking device that includes the infrared camera.

6. The method of claim 1, wherein the display device is located on an aircraft, integrated with an In-flight Entertainment (IFE) System, and the first operation and the second operation are associated with displaying content using the IFE system.

7. The method of claim 1, wherein the display device is part of a seat device on a transportation vehicle, and the hand tracking device is integrated with an armrest of a passenger seat on the transportation vehicle.

8. The method of claim 1, wherein a media file is played to instruct a user to move the user hand, when the captured plurality of images do not indicate a gesture recognized by the trained model.

9. A hand tracking device, comprising:
   a first infrared camera for capturing a plurality of images of a user hand indicating a first gesture for requesting a first action associated with operating a display device;
   wherein the hand tracking device utilizes the plurality of images to generate a three-dimensional image of the user hand; and detects the first gesture from the three-dimensional image using a trained model that stores a plurality of input gestures corresponding to three-dimensional images of user hands;
   wherein a first operation is executed in response to the detected first gesture; and the hand tracking device continuously monitors the user hand to detect a second gesture from the trained model for executing a second operation; and
   a plurality of mirrors that provide reflections of the user hand, and the first infrared camera takes a direct image of the user hand and images of the reflections of the user hand; wherein the plurality of mirrors includes a first mirror, a second mirror and a third mirror, the first mirror and the second mirror are located across from each other, and oriented in a vertical direction from a bottom surface of the hand tracking device that includes the first infrared camera.

10. The hand held device of claim 9, further comprising: a second infrared camera located a different surface of the hand tracking device at a different elevation than a location of the first infrared camera for capturing the plurality of images of the user hand.

11. The hand held device of claim 9, further comprising: wherein the third mirror is located adjacent to the first mirror and the second mirror and oriented in a vertical direction from the bottom surface.

12. The hand held device of claim 9, wherein the display device is located on an aircraft, integrated with an In-flight Entertainment (IFE) System, and the first operation and the second operation are associated with displaying content using the IFE system.

13. The hand tracking device of claim 9, wherein the display device is part of a seat device on a transportation vehicle, and the hand tracking device is integrated with an armrest of a passenger seat on the transportation vehicle.

14. The hand tracking device of claim 9, wherein a media file is played to instruct a user to move the user hand, when the captured plurality of images do not indicate a gesture recognized by the trained model.

15. A non-transitory, machine-readable storage medium having stored thereon instructions for performing a method, comprising machine executable code which when executed by a hand tracking device, causes the hand tracking device to:
   capture a plurality of images of a user hand by an infrared camera of the hand tracking device interfacing with a display device, the user hand indicating a first gesture requesting a first action associated with operating the display device;
   wherein the plurality of images include a first image of the user hand taken directly from the user hand by the infrared camera, and at least a second image that is based on a reflection of the user hand at one of a plurality of mirrors located in the hand tracking device;
   wherein the plurality of mirrors includes a first mirror and a second mirror and a third mirror, the first mirror and the second mirror are located across from each other and oriented in a vertical direction from a first surface that includes the infrared camera;
   detect the first gesture from a three-dimensional image generated from the plurality of images based on a trained model that stores a plurality of input gestures, each gesture corresponding to one of a plurality three-dimensional images of user hands;
   execute a first operation by the display device in response to the detected first gesture; and
   monitor the user hand by the infrared camera and the plurality of mirrors to detect a second gesture from the trained model for executing a second operation.

16. The non-transitory machine-readable storage medium of claim 15, wherein the infrared camera is located at a bottom surface of the hand tracking device to take the first image.

17. The non-transitory machine-readable storage medium of claim 15, wherein the plurality of images, the first gesture and the second gesture are used to update the trained model.

18. The non-transitory, machine-readable storage medium of claim 15, wherein the plurality of images is captured by the infrared camera and another infrared camera, the infrared camera and the other infrared camera located at different surfaces of the hand tracking device at different elevations within the hand tracking device.

19. The non-transitory machine-readable storage medium of claim 15, wherein the third mirror is located adjacent to the first mirror and the second mirror, and oriented in a vertical direction from a bottom surface of the hand tracking device that includes the infrared camera.

20. The non-transitory machine-readable storage medium of claim 15, wherein the display device is located on an aircraft, integrated with an In-flight Entertainment (IFE) System, and the first operation and the second operation are associated with displaying content using the IFE system.

21. The non-transitory machine-readable storage medium of claim 15, wherein the display device is part of a seat device on a transportation vehicle, and the hand tracking device is integrated with an armrest of a passenger seat on the transportation vehicle.

22. The non-transitory machine-readable storage medium of claim 15, wherein a media file is played to instruct a user to move the user hand, when the captured plurality of images do not indicate a gesture recognized by the trained model.

* * * * *